United States Patent [19]

McAulay

[11] Patent Number: 4,811,210
[45] Date of Patent: Mar. 7, 1989

[54] A PLURALITY OF OPTICAL CROSSBAR SWITCHES AND EXCHANGE SWITCHES FOR PARALLEL PROCESSOR COMPUTER

[75] Inventor: Alastair D. McAulay, Dallas, Tex.

[73] Assignee: Texas Instruments Incorporated, Dallas, Tex.

[21] Appl. No.: 901,868

[22] Filed: Aug. 29, 1986

Related U.S. Application Data

[63] Continuation-in-part of Ser. No. 802,652, Nov. 27, 1985.

[51] Int. Cl.⁴ ................................................. G06F 7/56
[52] U.S. Cl. ..................................... 364/200; 364/822; 370/1; 350/96.13; 350/96.15
[58] Field of Search ... 364/200 MS File, 900 MS File, 364/822; 370/1; 350/96.2, 96.13, 96.15

[56] References Cited

U.S. PATENT DOCUMENTS 4,358,858 11/1982 Tamura et al. .................. 455/607
4,543,662 9/1985 Huignard et al. ................ 455/600

FOREIGN PATENT DOCUMENTS 55-135801 10/1980 Japan .
55-50224 11/1980 Japan .
59-122142 7/1984 Japan .
60-51342 3/1985 Japan .
2164516 3/1986 United Kingdom .

*Primary Examiner*—David Y. Eng
*Assistant Examiner*—Emily Y. Chan
*Attorney, Agent, or Firm*—Melvin Sharp; James T. Comfort; Thomas G. Devine

[57] ABSTRACT

A computer (30) has parallel elementary processors (P1, ..., PK) interconnected by an optical crossbar switch (32). Multiple groups of processors, each having a separate crossbar switch, are connected by exchange switches. Optical fibers (34) are used to provide high speed communication between the processors and the switch (32). The optical crossbar switch (32) is reconfigurable dynamically. The computer is reconfigurable to provide efficient implementations of signal processing and logical inference computations, including a systolic filter, a fast Fourier transform, a correlator and a matrix-vector multiplier, forward and backward chaining inference machine, and speech recognizer.

2 Claims, 29 Drawing Sheets

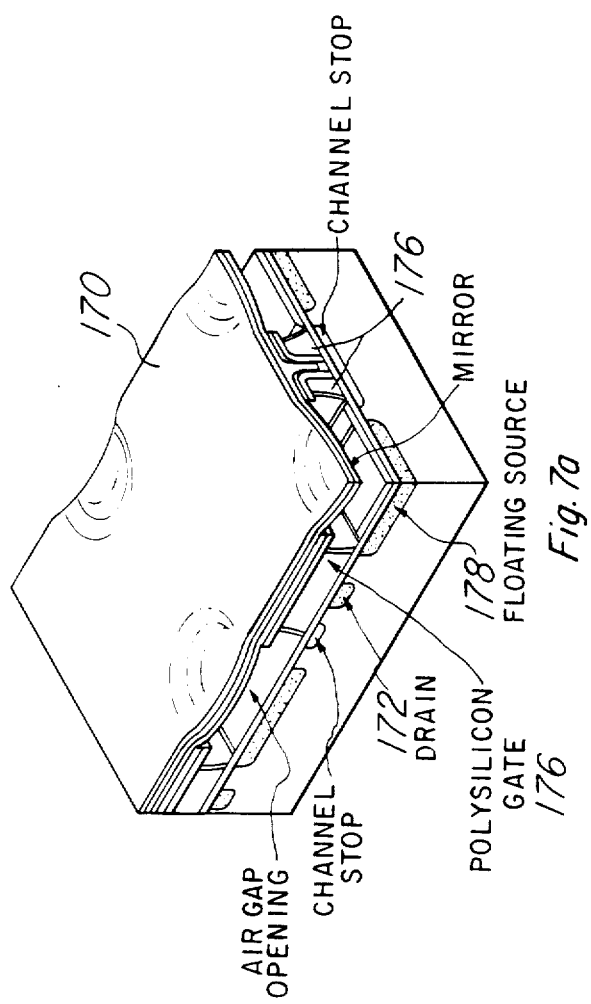

S  SENTENCE
NP  NOUN PHRASE
VP  VERB PHRASE
V  VERB
PP  PREPOSITIONAL PHRASE
PREP  PREPOSITION

TREE MAY BE WRITTEN:

S(NP, VP(V, NP, PP(PREP, NP)))

(B) REPRESENTATION

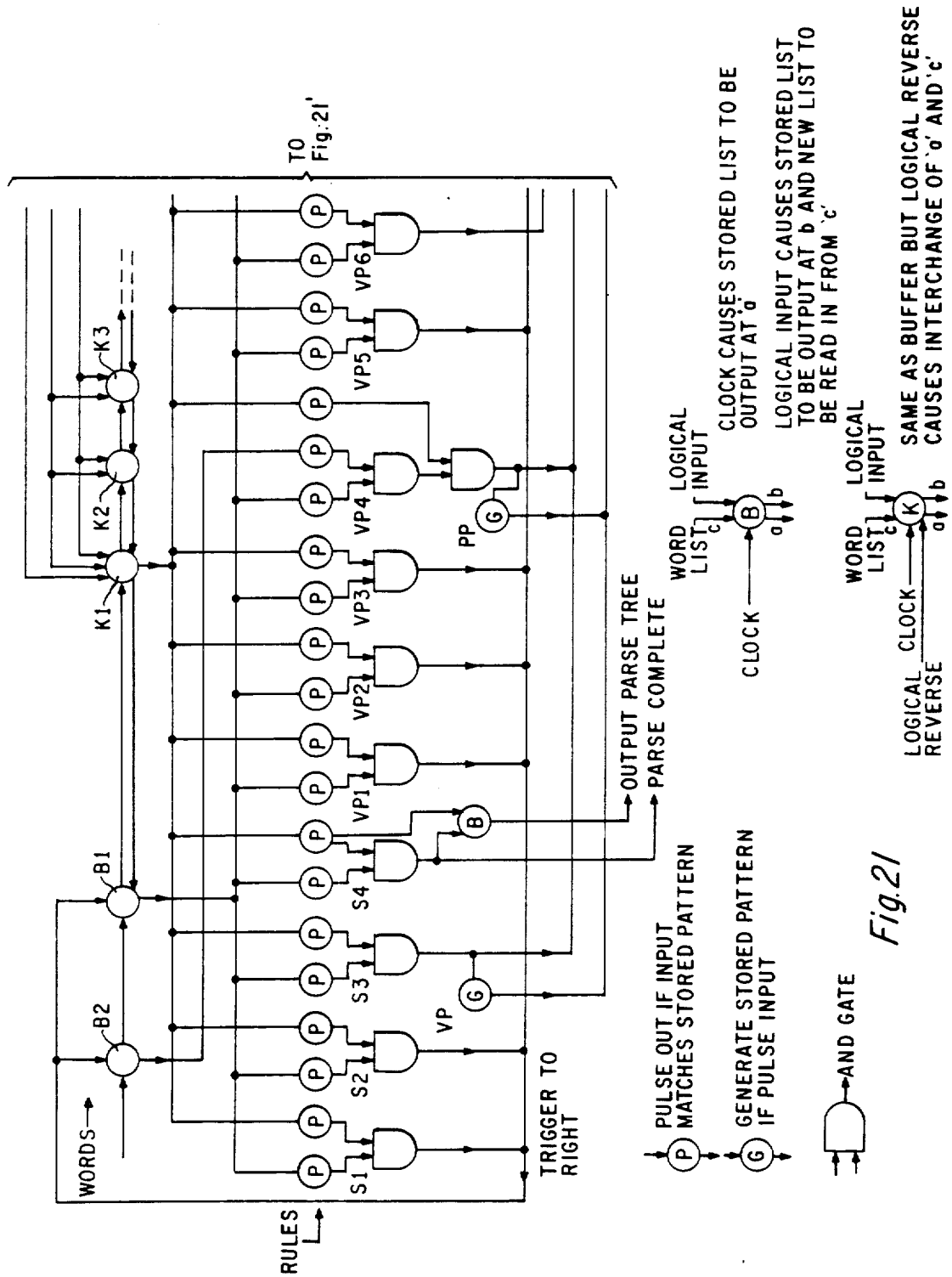

A PLURALITY OF OPTICAL CROSSBAR SWITCHES AND EXCHANGE SWITCHES FOR PARALLEL PROCESSOR COMPUTER

CROSS-REFERENCE TO RELATED APPLICATIONS

This application is a continuation-in-part of application Ser. No. 802,652, filed Nov. 27, 1985. The cross-referenced application is assigned to the assignee of the present application.

BACKGROUND OF THE INVENTION

1. Field of Invention

The present invention relates to electronic computers, and, more particularly, to computers with interconnected parallel processors.

2. Prior Art

Major trends shaping real time computation include parallel processing and symbolic processing. Many real time applications require rapid logical decisions using stored knowledge and the processing of large quantities of data at high speed. Moreover, close coupling between the symbolic and numeric computations is often desirable in fields such as speech and image understanding and recognition, robotics, weapon systems, and industrial plant control. Indeed, the widespread use of smaller computers in offices and homes and the emerging disciplines of artificial intelligence and robotics have drawn attention to the fact that an increasing amount of computing effort is spent in non-numeric or symbolic computing: many software tools used with computers, such as editors, compilers, and debuggers, make extensive use of symbolic processing. Symbolic computing leads to new methods of solving problems over and above numerical and statistical approaches because qualitative information or a priori knowledge may be made available in the form of data bases and procedures.

Attempts to solve real world problems requiring human-like intelligence, for example in robotics, speech, and vision, demand enormous amounts of symbolic and numeric computing power because of the vast amount of a priori information required for what are considered to be simple operations and the high data rates from sensors. Indeed, the signal processing of sensor data arises in fields such as acoustics, sonar, seismology, speech communication, biomedical engineering, etc. and the typical purposes of such processing include estimation of characteristic parameters, removal of noise, and transformation into a form which is more desirable. In the past, most signal processors have been tailored for speed and efficiency for a few specific algorithms. Future signal processors will need increased speed and algorithm flexibility, so that algorithms such as high resolution eigensystem beam-forming and optimal Wiener filtering may be computed with the same processor and so that new algorithms may be efficiently implemented as they are developed. The ability to handle a wide range of algorithms in military systems permits different algorithms to be used during a mission and field equipment to be upgraded with new algorithms. Conventional vector approaches cannot satisfy the increasing demand for computer performance and it is necessary that future designs be capable of efficiently utilizing extensive parallelism, see McAulay, Parallel Arrays or Vector Machines. Which Direction in VLSI?, IEEE Publn. 83CH1879-6. IEEE International Workshop on Computer Systems Organization. IEEE Computer Society, New Orleans. March. 1983, L. S. Haynes, R. L. Lau, D. P. Siewiorek, and D. W. Mizell, Computer 15(1), 9(1982), J. Allen, IEEE Proc., 73(5), 852 (1985), and A. D. McAulay, in IEEE Region 5 Conf. Proc., 85CH2123-8, (1985). These references, along with all others herein, are hereby incorporated by reference.

Very large scale integration in semiconductor devices is also leading towards the greater use of parallelism. Parallelism requires some sort of interconnection between the processing elements and this introduces a trade off between speed and the ability to handle a wide range of algorithms. For example, a complex interconnection network provides some flexibility at the expense of speed, and high speed may be achieved by means of fixed interconnections for a specific algorithm. The problem is to achieve very high speed by efficiently using a large number of processing elements and at the same time retain extremely high algorithm flexibility. Efficiency for parallel processing is the gain in speed versus that using a single processor of the same type divided by the number of processors. Also, the complexity of the processing elements relates to the degree of parallelism obtainable; sophisticated computations tend to have parts that are not parallelizable at a coarse level. The overall speed is dominated by the parts which are non-parallelizable at a coarse level. And a large number of fast elementary processors places a considerable communication burden on the interconnection between processors. There is a need for parallel processor interconnections that possess simple reconfigurability.

Currently, most experimental systems have demonstrated the difficulty of achieving parallelism for a range of algorithms with even modest numbers of processors (McAulay, Parallel Arrays or Vector Machines. Which Direction is VLSI?. IEEE Publn. 83CH1879-6, IEEE International Workshop on Computer Systems Organization, IEEE Computer Society, New Orleans, March, 1983). The number of parallel processors (hence speed) which may be used efficiently is limited in today's prototype and proposed systems by the communication delay and interconnection complexity. The constraints imposed by the interconnections on algorithm design are a serious problem because they reduce opportunities to achieve performance by new algorithm design and raise cost by limiting the range of applications and the lifetime of the equipment.

Fixed interconnections limit the range of algorithms which may be efficiently implemented. For example, the limits of the bus structure in parallel computing with the NuMachine has been considered. (McAulay, Finite Element Computation on Nearest Neighbor Connected Machines, NASA Symposium on Advances and Trends in Structures and Dynamics, NASA Langley Research Center, Oct. 22, 1984). Systolic configurations, such as those in development at Carnegie-Mellon University (Kung H. T., Why Systolic Architectures? IEEE Computer, January, 1982 p37–46), use algorithm structure to reduce memory and instruction fetches. This reduces communication time and permits large numbers of processors to be efficiently used in parallel. However, the algorithm constraints are significant because of the fixed interconnections.

Algorithm flexibility may be achieved by complex reconfigurable interconnection networks, (Siegel H. J., Interconnection Networks for Large Scale Parallel Processing. Theory and Case Studies, Lexington Books, 1984) and a prototype system having 8 processors and using a Banyan switch is in operation at the University of Texas at Austin (Browne J. C. Parallel Architectures for Computer Systems. Physics Today, Vol. 37, No. 5, May 1984). A Banyan is a multichannel switch composed of levels of 2×2 switches. However, this type of reconfigurability introduces large delays and high control overhead in most proposed systems and this restricts the number of processors and the speed of the system.

The distribution of effort amongst a number of processors does not remove the need for some minimum level of central control, although, for fault tolerance purposes this may not always be the same physical part of the system. The idea of a single program which alone determines the complete operation of the computer is replaced by numerous such programs running concurrently in different processors. The communication channel to the central control must be sufficient to prevent it from becoming a bottleneck. And common memory is frequently used in the process of communicating information from one processor to another. A potential difficulty, memory contention, arises when two or more processors request the same piece of information form a common memory at the same time. Some arbitration is now required and one processor will have to remain idle or make the memory request again later. This increases complexity, cost and inefficiency. A simple example arises in matrix-matrix multiplication where a single row of a first matrix is required in all processors for simultaneous multiplication with each column of a second matrix. Memory contention for such well-defined operations should be taken care of in the computer design.

Great skill is required to partition problems so that various processors complete their tasks at the appropriate time to provide information for the next stage. Synchronization forces everything to wait for the slowest link with resulting inefficiency. A parallel algorithm may involve more steps than a commonly used serial algorithm even though it is more efficient on a specific parallel machine. The overhead reduces the efficiency of the algorithm where efficiency is measured as the speed on the multi-processor divided by the speed with the fastest algorithm on a single processor. The stability and accuracy of the parallel algorithm relative to the serial algorithm must also be considered in comparison.

The communications industry makes widespread use of optical fibers and is developing optical switching devices to avoid conversion to electronics and back for switching purposes. Optics has been suggested for communication with VLSI to overcome the bandwidth pin limitations and edge connection constraints: see Goodman J. W. Leonberger F. J., Kung S. Y. and Athale R. A. Optical Interconnections for VLSI Systems, Proc. IEEE. Vol. 72, No. 7, July 1984, p850–866, and Neff J. A. Electro-optic techniques for VLSI Interconnect, AGARD-NATO Avionics Panel Specialists' Meeting on Digital Optical Circuit Technology, September 1984.

Digital optical computers are expected to eventually become dominant and a design has been proposed for solving a major class of problems, finite elements (see McAulay, Deformable Mirror Nearest Neighbor Optical Computer, to appear in Optical Engineering (1985) and applicant's copending U.S. Appl. Ser. No. 777,660), now abandoned. This design uses deformable mirrors or other spatial light modulators (see Pape D. R. and Hornbeck L. J., Characteristics of the Deformable Mirror Device for Optical Information Processing, Opt. Eng. Vol. 22, No. 6, December 1983, p 675–681). Machines using acousto-optics for matrix algebra operations are in research. These computers, although significant for numerical computation, have limited algorithm felxibility because of the interconnection systems used. They are also not aimed at signal processing applications.

Data Flow has been studied extensively at MIT, SRI and in Japan; see, Arvind and Iannucci R. A. Two Fundamental Issues in Multiprocessing: the Dataflow Solution, MIT Report, MIT/LCS/TM-241, September 1983; Hiraki K., Shimada T., Nishida K., A Hardware Design of the Sigma-1, a Dataflow Computer for Scientific Computations, Proc. IEEE International Conf. on Parallel Processing, August 1984; Jaganathan R. and Ashcroft E. A., Eazyflow; A Hybrid Model for Parallel Processing, Proc. IEEE International Conf. on Parallel Processing, August 1984; Omandi A., Klappholtz D., Data Driven Computation on Process Based MIMD Machines. Proc. IEEE International Conf. on Parallel Processing, August 1984; and Rong, G. G, Pipelining of Homogeneous Dataflow Programs, Proc. IEEE International Conf. on Parallel Processing, August 1984. Permitting operations to occur as soon as the necessary inputs are present is generally seen as a possible means of using parallelism because it avoids the use of a single program counter as in a von Neumann machine. However, there are many proposed forms of data flow machine and there are no major systems in operation today. Texas Instruments has previously developed software and hardware for dataflow systems (Oxley D., Sauber B., Cornish M., "Software development for Data-Flow machines", in Handbook of Software Engineering, C. R. Vick and C. V. Ramamoorthy (Editors), 1984 and U.S. Pat. No. 4,197,589). Problems associated with interconnection and the matching of algorithm and processor are not automatically resolved by the dataflow concept.

SUMMARY OF THE INVENTION

The present invention provides a very high speed computer by using a large number of elementary processing elements to efficiently achieve maximal parallelism and at the same time maintains extremely high algorithm flexibility by means of a fast large generalized interconnection network in the form of an optical spatial light modulator. The optical spatial light modulator may act as a crossbar switch or as a database, and more than one optical spatial light modulator may be used. A crossbar switch permits any processing element to be connected directly to any combination of other processing elements, and the use of simple processing elements allows parallelism of parts not parallelizable at a coarser level. In preferred embodiments, the processing elements are adders, multipliers, comparators, and so forth.

This solves the problems of elementary processor level parallelism and algorithm flexibility. And the optical interconnections have advantages over electronic interconnections by reducing effects of capacitance loading and increasing immunity to mutual interference and have the performance of hardwired systems. Also, the crossbar switch permits a simple extension of the computer to twice as many processors by insertion of another crossbar switch plus electro-optical switches for routing to the crossbar switches.

BRIEF DESCRIPTION OF THE DRAWINGS

FIGS. 7A-C schematically illustrates a deformable mirror device operation;

DESCRIPTION OF THE PREFERRED EMBODIMENTS

We first give a summary description of the features of a general optical crossbar interconnected computer and then the details of preferred embodiments.

Systems Overview

Figure 1:
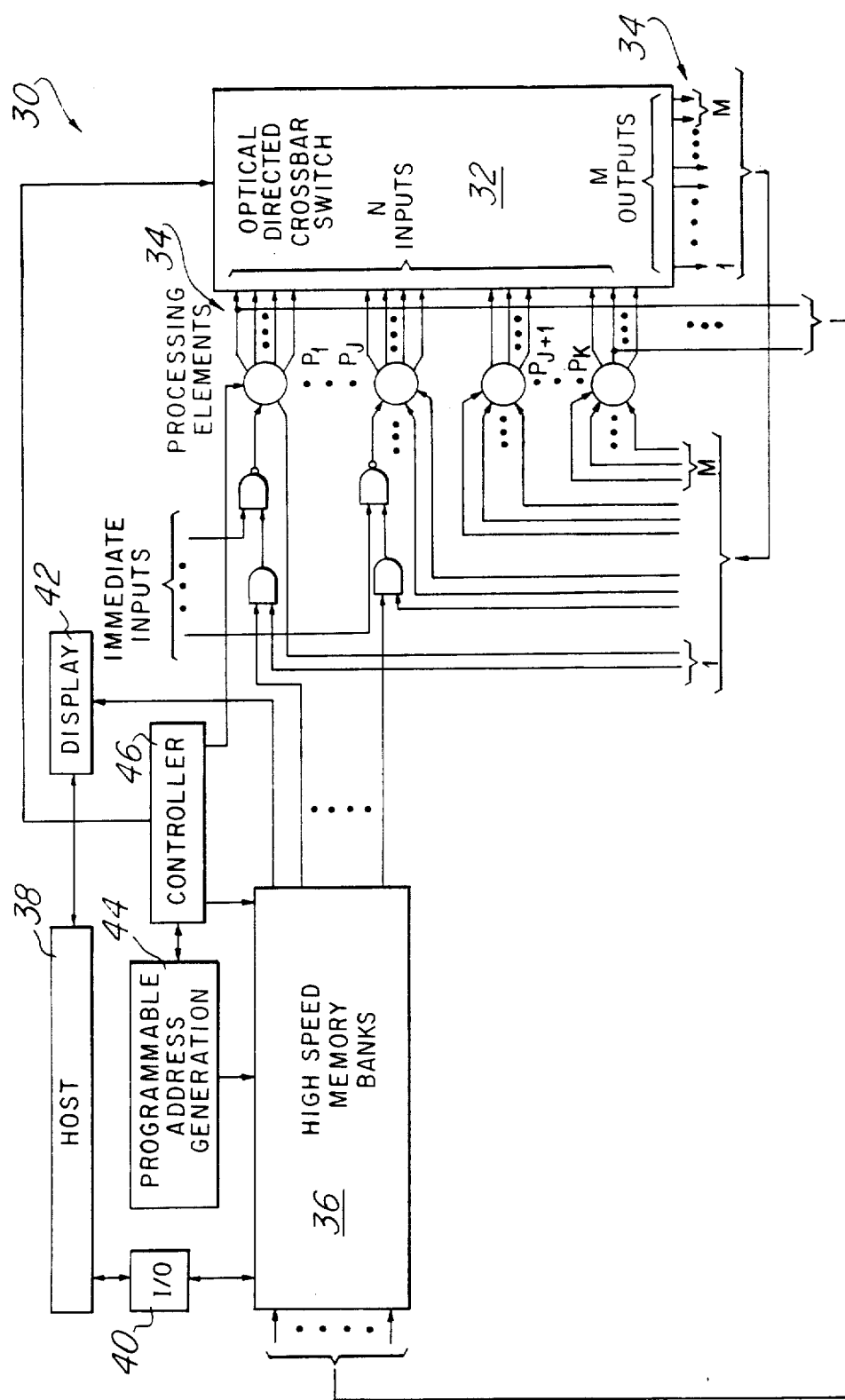
FIG. 1 schematically illustrates the organizational structure for a general optical crossbar connected parallel processor computer.

An optical crossbar interconnected computer permits direct mapping of algorithm graphs in order to efficiently implement and enable fast operation of a wide range of processing algorithms while automatically taking maximum advantage of low level parallelism. FIG. 1 schematically illustrates such a computer, generally denoted 30, which includes an optical high-bandwidth, reconfigurable N by M crossbar switch 32 connected by optical fibers 34 to each of K elementary processors P1 to PK. Each elementary processor output goes to one row of crossbar switch 32 and each column of crossbar switch 32 goes to one input of an elementary processor; thus N is the total number of outputs and M is less than or equal to the total number of inputs (this allows for independent external inputs as illustrated in FIG. 1). For example, a 1024 by 1024 crossbar switch permits 512 elementary processors, assuming four connections (two input and two output) to each. The elementary processors may be a mix of multipliers, adders, (multiply-adders), comparators, buffer registers, programmable elements, and input/output registers for general purpose signal processing or logic gates, comparators, pattern matchers ... for general purpose symbolic processing. As a result of testing algorithms for a specific application area, a tailored system is readily defined which optimizes the mix and number of elements attached to the crossbar switch. Computer 30 also includes memory 36, host computer 38, input/output 40, display 42, programmable address generator 44, and controller 46; note that these devices are peripheral to the main crossbar switch/elementary processor architecture and could be replaced in other versions of computer 30. Basically, the operation of processor 30 is as follows: after each parallel processing step, each of the elementary processors P1 to PK simultaneously outputs its results through the crossbar switch 32 to the inputs of selected others of the elementary processors P1 to PK to be the input for the next parallel processing step. This pass of data through crossbar switch 32 may be either in parallel (in which case each data bit requires an output line of the elementary processor and a row of crossbar switch 32) or serial (in which case parallel-to-serial converters and multiple clock cycles are required for the data pass) or a combination.

Figure 2:
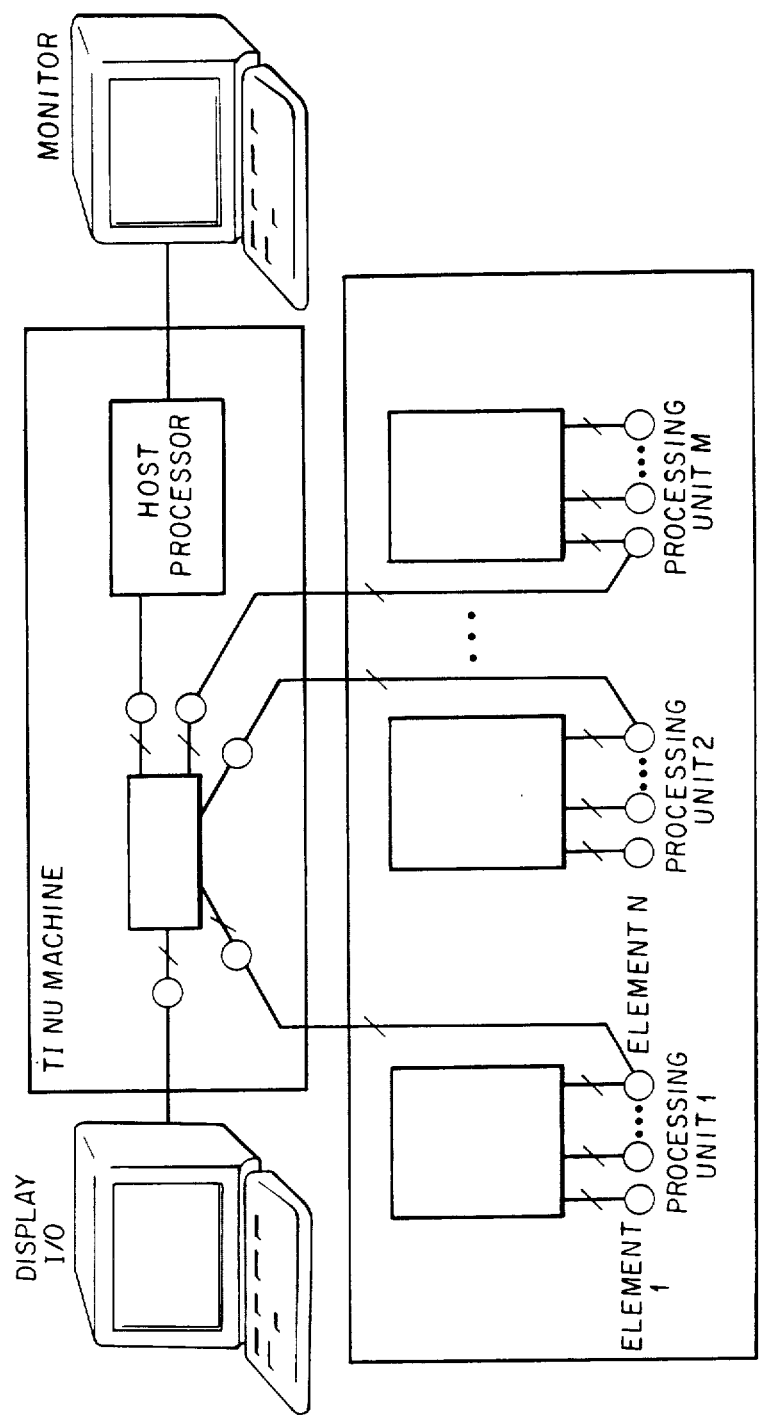
FIG. 2 illustrates high level parallel architecture.

FIG. 2 illustrates how a group of these computers, each denoted as a processing unit, may be connected to form a system permitting the user to take advantage of high level parallelism. Thus the processing units are connected in parallel, and the elementary processors are connected in parallel in each processing unit.

The user defines the algorithm he wishes to implement in mathematical notation or in a high level language such as Ada. Software in the host computer 38 constructs a flow graph and proceeds to set up tables defining the interconnection network, the operations required to be performed by elementary processors, and the timing schedule for these operations. These are mapped into the hardware; the network into crossbar switch 32 settings and the operations into available elementary processors P1 to PK. The mapping is such that timing constraints will be satisfied while efficiently utilizing the resources available. A library of configurations for different algorithms can be maintained for future use.

The user has only to supply data to the computer and the processed data will appear at the output after some delay. Each elementary processor will perform its operation as soon as it receives the necessary logic or numeric inputs and will automatically pass outputs to the crossbar switch for routing to the next operation required. A continuous stream of data needs to be processed through the same algorithm in signal processing applications, consequently, pipelining through a unit with elementary processors will make maximum use of the parallelism available. Several parallel streams may be used if this makes better use of resources.

The system has the following benefits:

1. Easy to use. Sophisticated software and high bandwidth crossbar switch removes the need for the programmer to worry about parallelizing his code at a low level, it is done automatically for him with most algorithms.

2. Software reconfigurability of the crossbar switch permits a completely new set of algorithms to run optimally, thus extending field equipment life and permitting the same computer to be switched rapidly from one algorithm to another.

3. Fault tolerance. Faulty elements may be bypassed because of the ability to rapidly reconfigure the crossbar switch.

4. High Performance. The crossbar switch enables full parallelism to be used at the lowest level for a wide range of algorithms because the algorithm graph may be mapped directly onto the computer.

5. Accuracy. Accuracy is determined by the selection of processing elements.

6. Optical crossbar switch. Silicon deformable mirror devices permit rapid electronic reconfigurability and minimize communication times for algorithms requiring interconnections between diverse elementary processors.

7. Optical fiber link. 3 GHz fiber links readily permit link to other boards as fibers exhibit no capacitative loading effects.

8. Programmed dataflow. The flow of data is programmed by the crossbar switch and this permits parallel streams of data to flow, unlike serial von Neumann processors which use program counters. The need to fetch information and instructions from remote memory is avoided.

Signal Processing

System description

Figure 3:
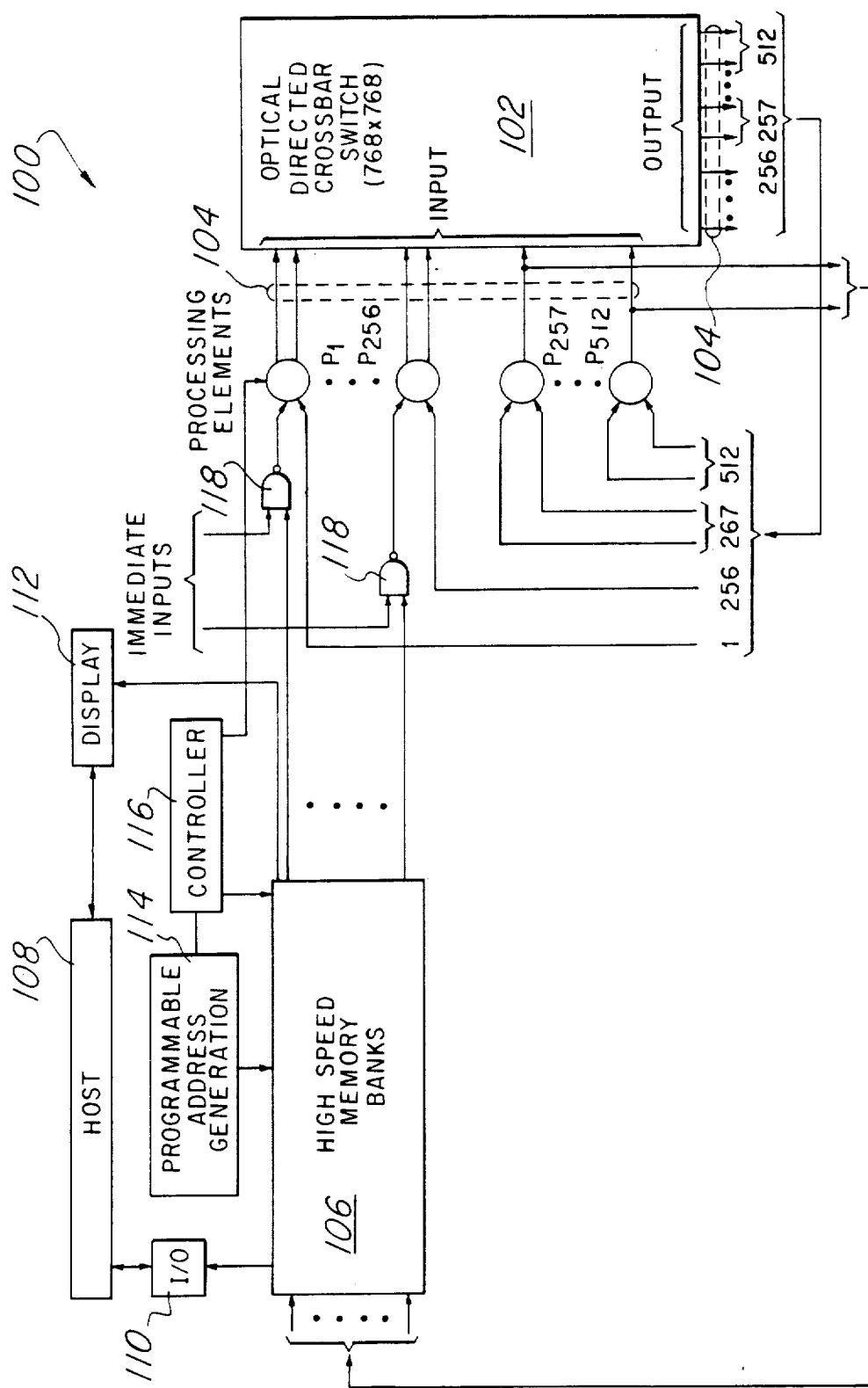
FIG. 3 schematically illustrates a first preferred embodiment optical crossbar connected parallel signal processor.

FIG. 3 shows an organizational structure for an optical crossbar signal processor, generally denoted 100. 512 elementary processors (reference numerals P1 to P512) are connected to a 768 by 768 optical crossbar switch 102 with 320 Megabit/second or higher serial fiber optic links 104. The first 256 processors, P1 to P256, have two inputs, one from switch 102 and the other directly from a digitized sensor or from main memory 106. There are two outputs which go directly into optical crossbar switch 102. Processors P1 to P256 act only as multipliers for the basic algorithms considered in the first preferred embodiment signal processor. The second 256 processors, P257 to P512, have two inputs from switch 102 and one output which is fed directly to main memory 106 and to switch 102. Processors P257 to P512 act only as adders for the algorithms considered. Subdivision into two banks of elementary processors is advantageous for the algorithms considered as data can be passed back and forth between them.

Multiple memory paths generate high bandwidth between main memory 106 and processors P1 to P256. Optical crossbar switch 102 channels the data returning to memory 106 into the correct bank of processors for future computation in order to reduce memory management and addressing complexity and maintain speed, (see FFT section later). System 100 also includes a host computer 108, input/output 110 between host 108 and memory 106, a display 112, programmable address generator 114, controller 116, and 256 NAND gates 118 for immediate input. Data shuffling could be performed by resetting switch 102 within a few microseconds by means of frame buffering or by optical setting. Optical setting, as distinct from electronic setting, has been demonstrated, see D. R. Pape, Opt. Eng., 24(1), 107 (1985). Normally only long vectors are moved sequentially between memory and processors, aleviating the address computation difficulties for such a high speed machine. Implementations of algorithms that loop in switch 102 before returning to memory 106 are desirable to reduce the performance requirements and time associated with memory transfers, (see FFT section later).

Processing element description

Figure 4:
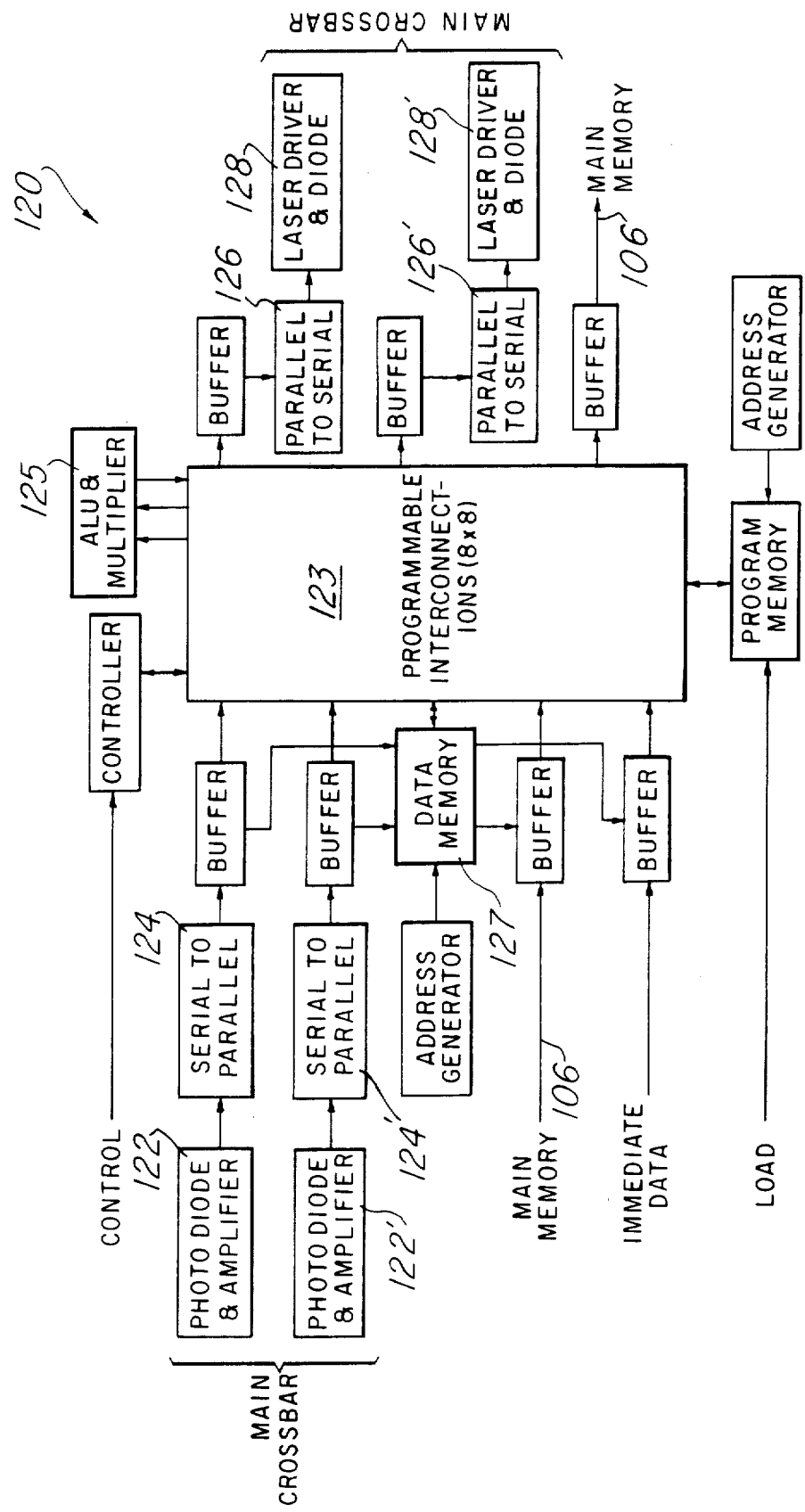
FIG. 4 schematically illustrates an elementary processor of the first preferred embodiment.

FIG. 4 shows an elementary processor structure generally denoted by reference numeral 120 and will be used for P1 to P512 of signal processor 100. (Note that the Texas Instruments VHSIC array processor and the systolic chip development at Carnegie-Mellon University [see H. T. Kung and O. Menzilcioglu. in Real Time Signal Processing VII, K. Bromley, ed., Proc. SPIE 495, 130 (1984) use programmable crossbar switches in their processor designs.] Data from main optical crossbar switch 102, representing the two operands for processor 120 operation, enter at the left in FIG. 4 and are detected by photodiodes 122 and 122' and converted from serial to parallel by converters 124 and 124'. An operand may also come from the main memory, the local elementary processor memory 127 or a digitized sensor. The output of the computation at the right side is fed to a parallel to serial converters 126 and laser drivers 128 for return to optical crossbar switch 102. A second output is provided for systolic type configurations in which input data must be passed through an elementary processor. The output may also pass to main memory 106. The arithmetic operations are carried out in ALU and multiplier 125 with programmable 8 by 8 interconnection 123 tying the input, output and ALU/multiplier together. Thus, for example, interconnection 123 could pass the input from converter 124' to output converter 126' without change, also pass the inputs from converters 124 and 124' to ALU/multiplier 125 to be multiplied, and lastly pass the multiplication product to output converter 126. (This is, in fact, the set up for the first bank of elementary processors in the systolic filtering example it infra.)

FIG. 3 shows that top half processors are connected differently from the the bottom half processors. Normal operation of the processor is under control of a local program and initiation of a computation or move cycle is determined by a master synchronizing signal. Multi Gigaflop performance requires the use of commercially available 100 nanosec multiplier and adder chips.

Optical crossbar switch and deformable mirror device description

Figure 5A:
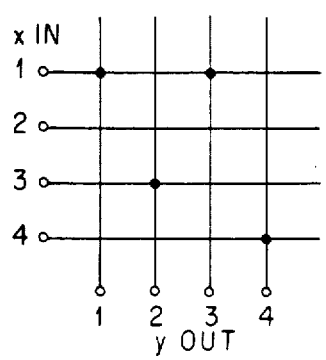
FIGS. 5A-B schematically illustrate the operation of an optical crossbar switch.
Figure 5B:
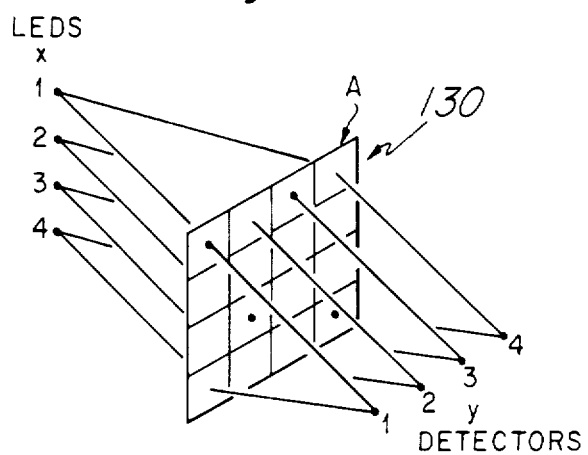

FIG. 5A shows a diagram for a 4 by 4 crossbar switch 102. Each intersection has a directional switch permitting a horizontal input line to be coupled with a vertical output one. Black circles indicate closed switches. One output receives information from one input, but one input may broadcast to several outputs. FIG. 5B shows a diagrammatic crossbar switch 102 implemented with spatial light modulator 130 and dots indicate transparent regions consistent with the settings of FIG. 5A. An optical lens system (not illustrated) is used to spread the light from the input sources (LEDs 1-4) horizontally without spreading the light vertically. Light passing through spatial light modulator 130 is collapsed onto receiving diodes (Detectors 1-4) by means of a lens system (not illustrated) which focusses vertically without spreading horizontally.

Figure 6:
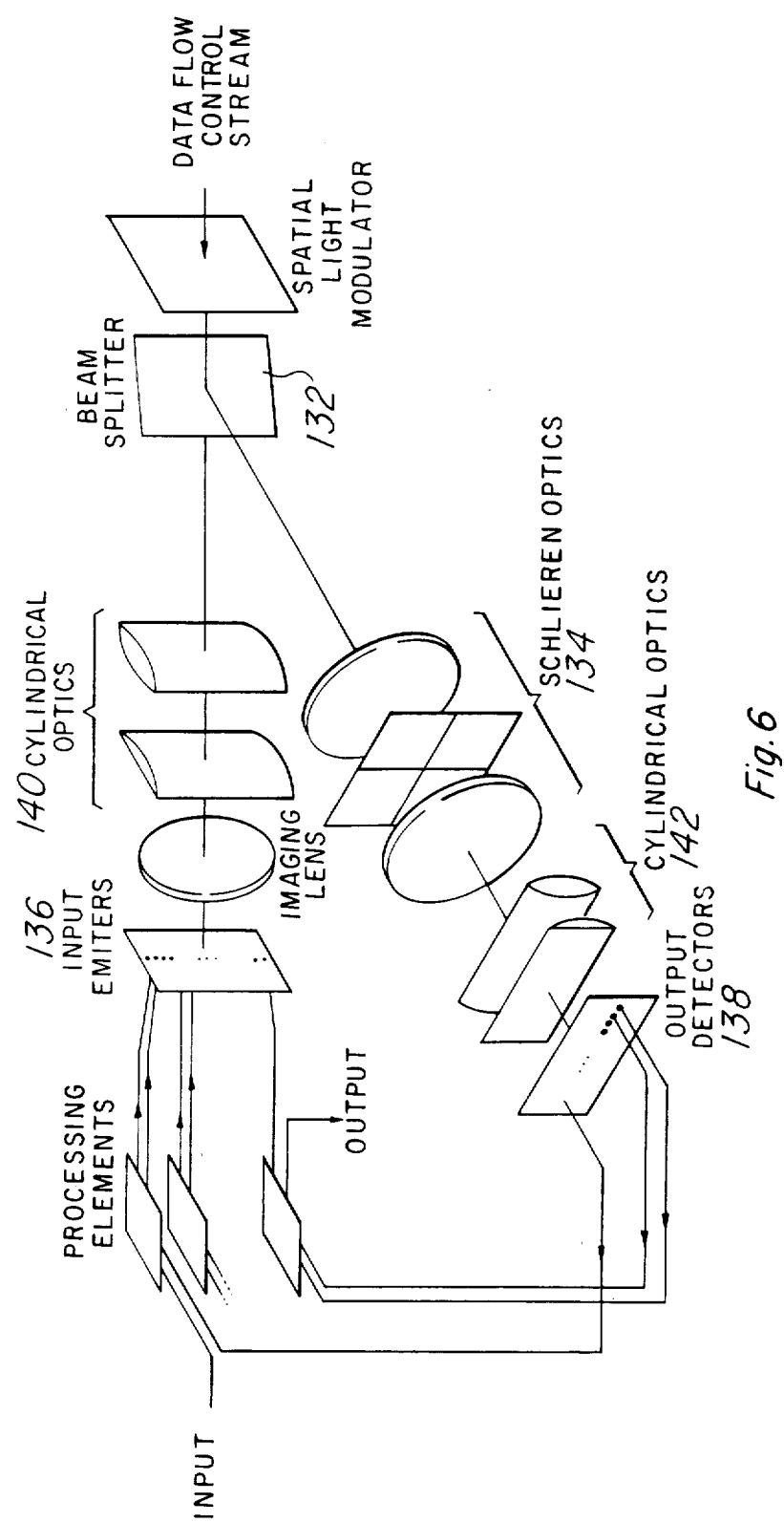
FIG. 6 schematically illustrates possible optics for a deformable mirror device type optical crossbar switch.

FIG. 6 illustrates switch 102 as implemented by a deformable mirror device (DMD) as the spatial light modulator 130. DMDs act as variable intensity reflectors rather than transparent modulators, consequently, the right side of the modulator is folded back. A beam splitter 132 is used to separate the returning light from the incident light. Schlieren optics 134 are used to block reflections from the regions between mirror deflection pixels of DMD 130. 512 laser diodes 136, with modulation capability to 3 GHz (see Y. Suematsu, Physics Today. 38(5), 32(1985)), will act as sources and 512 p-i-in diodes 138 as receivers; see J. W. Goodman, F. J. Leonberger, S. Y. Kung, and R. A. Athale, Proc. IEEE, 72(7), 850(1984) and J. A. Neff, in Digital Optical Circuit Technology, B. L. Dove, ed., AGARD Conf. Proc. 362, 17 (1985). The optics not illustrated in FIG. 5B are shown in FIG. 6; cylindrical optics 140 spreads the light from the input sources 136 horizontally and cylindrical optics 142 collapses the light vertically onto the receiving diodes 138. The light sources 136 and receivers 138 could be integrated directly on the electronic chips.

Deformable mirror devices (DMD) of the membrane and cantilever (R. N. Thomas, IEEE Trans. ED-22(9), (1975)) type have been developed. The results for imaging and performing spectral analysis with a Texas Instruments membrane DMD have been published; see D. R. Pape, L. J. Hornbeck, Opt. Eng., 22(6), 675 (1983). Membrane light modulators consist of an X-Y array of deformable mirror elements that can be addressed by an underlying array of MOS transistors; see FIG. 7A for a perspective view of four adjacent mirror elements and FIG. 7B for a schematic view of the array. A reflecting conductive membrane 170 covers the surface of the array and is the mirror. The line-addressed organizations of the DMD is shown in FIG. 7B; data are fed to a serial-to-parallel converter 171 that is connected to the drain lines 172 of the MOS transistors. Drain lines 172 are charged (the $k^{th}$ line 172 is charged to a potential $\phi_{k,m}$), and decoder 174, connected to gates 176, selects the $m^{th}$ gate to turn on. Floating sources 178 of the MOS transistors in the $m^{th}$ gate line 177 are then chrged to the potential of the corresponding drain 172 (the $m^{th}$ charged to $\phi_{k,m}$). The gate is then turned off, and mirror 170 is held at a fixed potential of $V_M$; thus an electrostatic force proportional to $V_M$-$\phi_{k,m}$ acts on the $(k,m)^{th}$ mirror element and causes it to deflect down towards the floating source 178. The mechanical response time of a mirror element and hence line settlig time is a few $\mu$sec. Once the floating sources 178 in the $m^{th}$ gate line 177 have been set, then the next line of data is fed into drain lines 172, and the next gate line 177 selected by decoder 174. A cantilever beam device is similar except that above each floating source it has small flaps each hinged by one corner and forming the conductive mirror. As with the membrane light modulator, turning on the transistor charges the floating source and causes the corresponding flap to bend at its hinge down towards the charged floating source. The deflection of the membrane or flap is a nonlinear function of the applied voltage and approximates the form illustrated in FIG. 7C; note that above a critical "collapse voltage" the membrane or flap is unstable against collapse to the charged capacitor plate. The size of the mirror elements for both the membrane and cantilever beam devices is in the order of 30 microns square.

Programming and functional operation.

The user derives approximate equations for computing a function of interest and selects algorithm for implementing the equations. A directed graph (see Allen, J., Computer Architectures for Digital Signal Processing, 73 IEEE Proc. 852 (1985)) is constructed for the algorithm in such a way as to exhibit maximum parallelism. The operations are represented as nodes and the connections as edges or arcs. The directed graph is mapped on to the optical crossbar switch system; the edges into crossbar settings and the nodes into available elementary processors in such a manner that timing constraints will be satisfied while efficiently utilizing the resources available. Flow graphs for systolic filtering, FFT and doubling algorithms for implementing convolution are mapped to processor 100 in the following. A parallel conjugate gradient algorithm graph is presented elsewhere; see A. D. McAulay, Conjugate Gradients on Optical Crossbar Interconnected Multiprocessor, Second SIAM Conf. on Parallel Processing for Scientific Computation, (November 1985). A significant goal is to develop software to automatically construct a directed graph with the maximum parallelism for an algorithm (W. B. Ackerman, Computer, 15(2), 15 (1982)) and then to map this efficiently onto the processor. This involves setting up tables defining the interconnection network, the operations required to be performed by elementary processors and the timing schedule for these operations.

The user supplies a stream or streams of data to the processor and results appear at the outputs every cycle once the pipeline is filled. Each elementary processor P1 to P512 will perform its operation at the next synchronization pulse after it receives all the necessary logic or numeric inputs and will automatically pass outputs to the crossbar switch 102 for routing to the next operation required.

Basic signal processing algorithms

Systolic filtering, convolution, correlation, and Fourier transforms are basic signal processing algorithms. A linear filter is $$c = a * b \quad c_n = \sum_{k=1}^{K} a_k b_{n-k} \quad 2 \leq n \leq N + K \quad (1)$$

where $a_k$, k=1 to K are filter coefficients and $b_n$, n=1 to N is data and * is the convolution operator.

Cross correlation of vectors a and b is written.

$$c_n = \sum_{k=1}^{K} a_k b_{k-n} \quad 1 - K \leq n \leq N - 1 \quad (2)$$

Comparison of equations (1) and (2) show that convolution and correlation may be computed with the same processor by reversing the order of one input. The following describes systolic. FFT and doubling methods of performing such operations on optical crossbar signal processor 100, although only sixteen elementary processors are illustrated for clarity.

Filtering long data streams in systolic mode

Figures 8A, 8B:
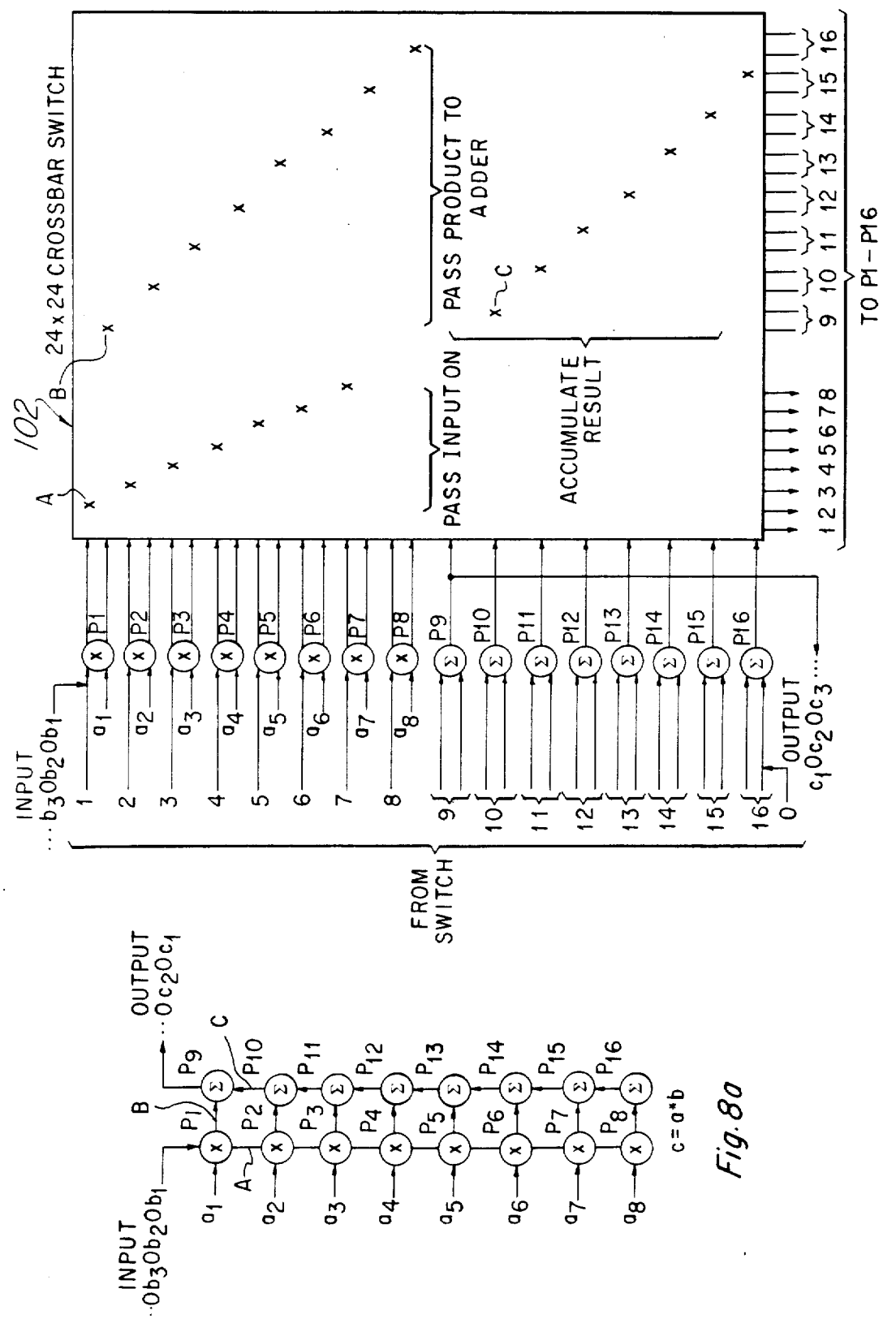
FIGS. 8A-B schematically illustrate the flow and crossbar switch settings for a filtering algorithm.

FIG. 8A shows the directed graph for implementing the filter, equation (1) in a systolic mode. The filter coefficients $a_k$ are stored in the multiplier processors P1 through P8. Data is entered serially into processor P1 with zeroes inserted between data values. The zeroes permit a two cycle operation, one cycle in which computations are performed and one cycle in which the data is moved to the next processor. All the processors perform corresponding computation and move operations simultaneously once the pipeline is full. Consequently at each move cycle a new value of the output $c_n$ comes out at the top right, processor P9. For example, the term $c_4 = a_1b_3 + a_2b_2 + a_3b_1$ arises as follows: First move cycle enters $b_1$ into P1 and all other elementary processors are full of 0's; first computation cycle is irrelevant for $c_4$ (i.e., the product $a_1b_1$ computed in P1 is for the term $c_2$); second move cycle transfers $b_1$ to P2 and enters a 0 into P1, all other transfers (i.e., the transfer of $a_1b_1$ from P1 to P9) are irrelevant; second computation cycle is again irrelevant; third move cycle transfers $b_1$ into P3, transfers the 0 into P2, and enters $b_2$ into P1; third computation cycle forms the product $a_3b_1$ in P3; fourth move cycle transfers $a_3b_1$ from P3 to P11, $b_2$ from P1 to P2, and enters a 0 in P1; fourth computation cycle forms the product $a_2b_2$ in P2 and the trivial sum of 0 and $a_3b_1$ in P11; fifth move cycle transfers the $a_3b_1$ from P11 to P10, the $a_2b_2$ from P2 to P10, and enters $b_3$ into P1; fifth computation cycle forms the sum $a_3b_1 + a_2b_2$ in P10 and the product $a_1b_3$ in P1; sixth move cycle transfers the $a_3b_1 + a_2b_2$ from P10 to P9 and the $a_1b_3$ from P1 to P9; sixth computation cycle forms the sum $a_3b_1 + a_2b_2 + a_1b_3$, which is $c_4$, in P9; and the seventh move cycle outputs $c_4$.

FIG. 8B shows an implementation of the directed flow graph of FIG. 8A on the computer of FIG. 3. Input is to processor P1. The upper output of processor P1 is fed back to the input of processor P2 via the top closed switch (marked A) in the upper left quadrant of crossbar switch 102. A second output from processor P1 is the input data value $b_n$ which is passed via a switch setting (marked B) on the right upper quadrant of crossbar switch 102 to the uppermost input of adder P9. The other input to adder P9 comes from adder P10 via a setting (marked C) in the lower right quadrant of crossbar switch 102. The output comes out of processor P9. An output is obtained every compute-move clock cycle once the pipeline is full as for a systolic array.

Fast Fourier Transforms (FFT)

An FFT may sometimes be used to advantage for correlating two equal length vectors, e.g., in matching input data against a template for recognition. The Fourier transform of the input data is computed and the values multiplied by the stored template transform coefficients. The result is inverse transformed. The total computation may be less than convolution in time because convolving two N long vectors takes approximately $O(N^2)$ multiply-add computations while convolving by FFT's, using padding by two, takes ony approximately $O(2N + 4N \log_2(2N))$ operations. The FFT is also important where spectral information is sought, for example, recognizing a ship from propellor motion in noisy data.

The Fourier transform of a finite sequence x is another finite sequence X given by:

$$X_k = \sum_{n=0}^{N-1} x_n e^{-j(2\pi/N)kn} \quad k = 0 \text{ to } N - 1 \quad (3)$$

Figure 9A:
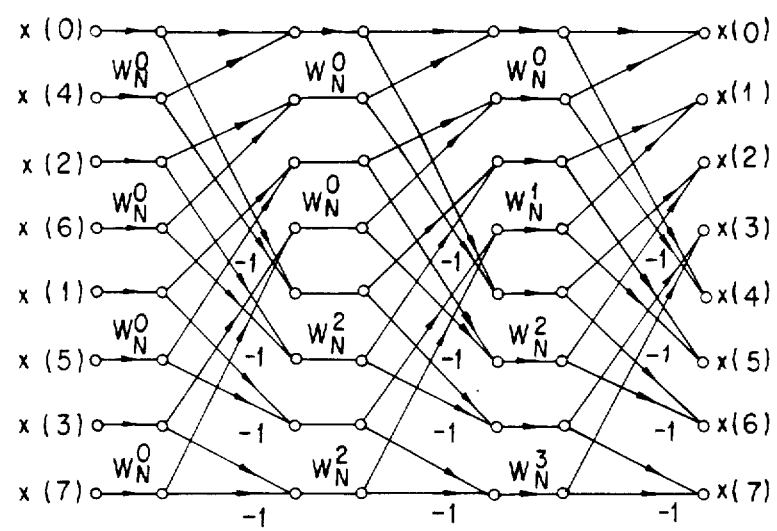
FIGS. 9A-C, 10 and 11A-B schematically illustrate the flow and crossbar switch settings for fast Fourier transforms.
Figures 9B, 9C:
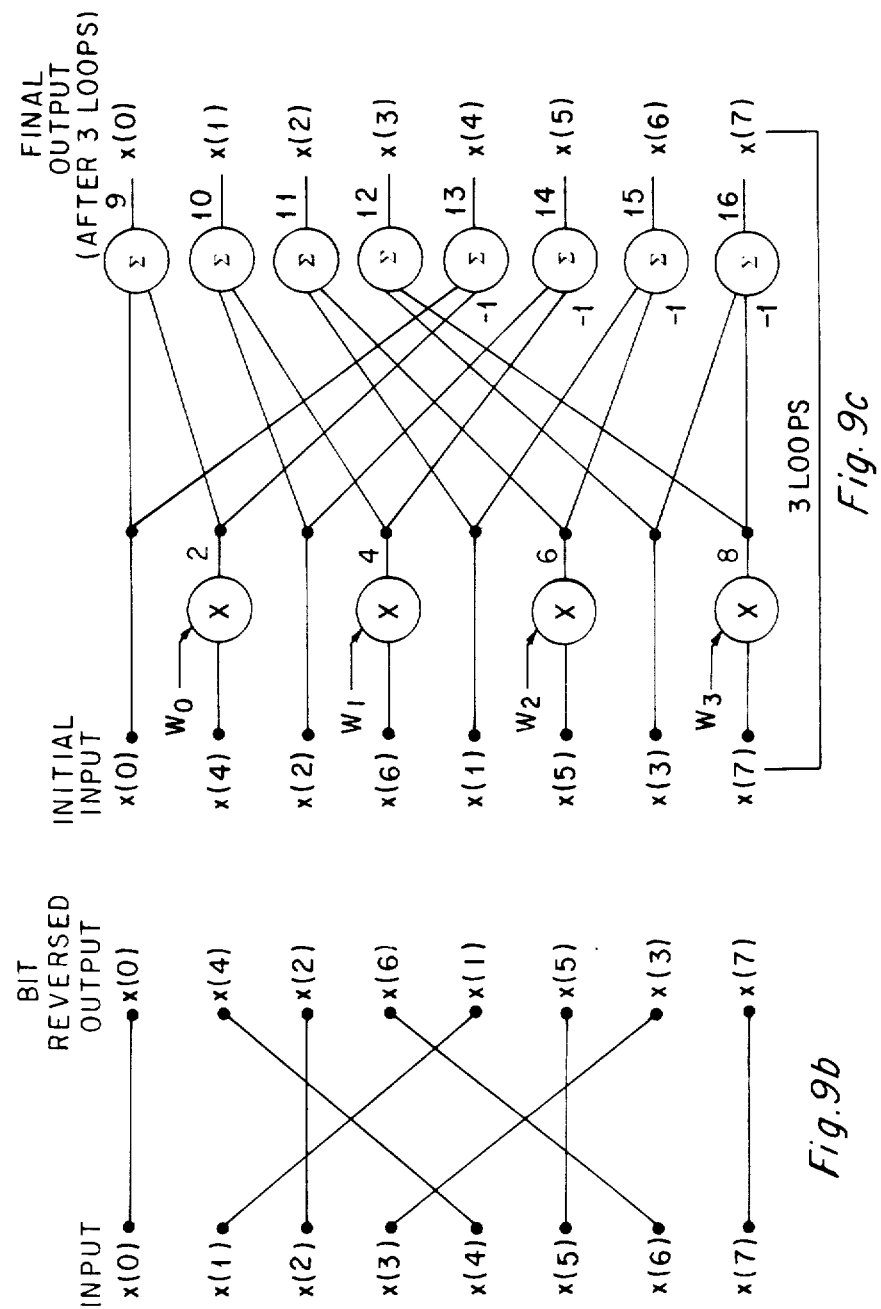

FIG. 9A shows a graph for an eight point decimation in time FFT, and FIG. 9B shows the bit reversal for the start of this configuration. FIG. 9C shows the fixed configuration stage which is used at each iteration by feeding the output at the right back to the input $\log_2 N$ times for an FFT of length N (for example, the eight point FFT illustrated takes $\log_2 8 = 3$ iterations as shown in FIG. 9A). The weights w, which correspond to the appropriate exponential terms in equation (3), must be altered on each iteration, also as indicated in FIG. 9A. These weights may stored in the elementary processor local memory 127 or main memory 106.

Figure 10:
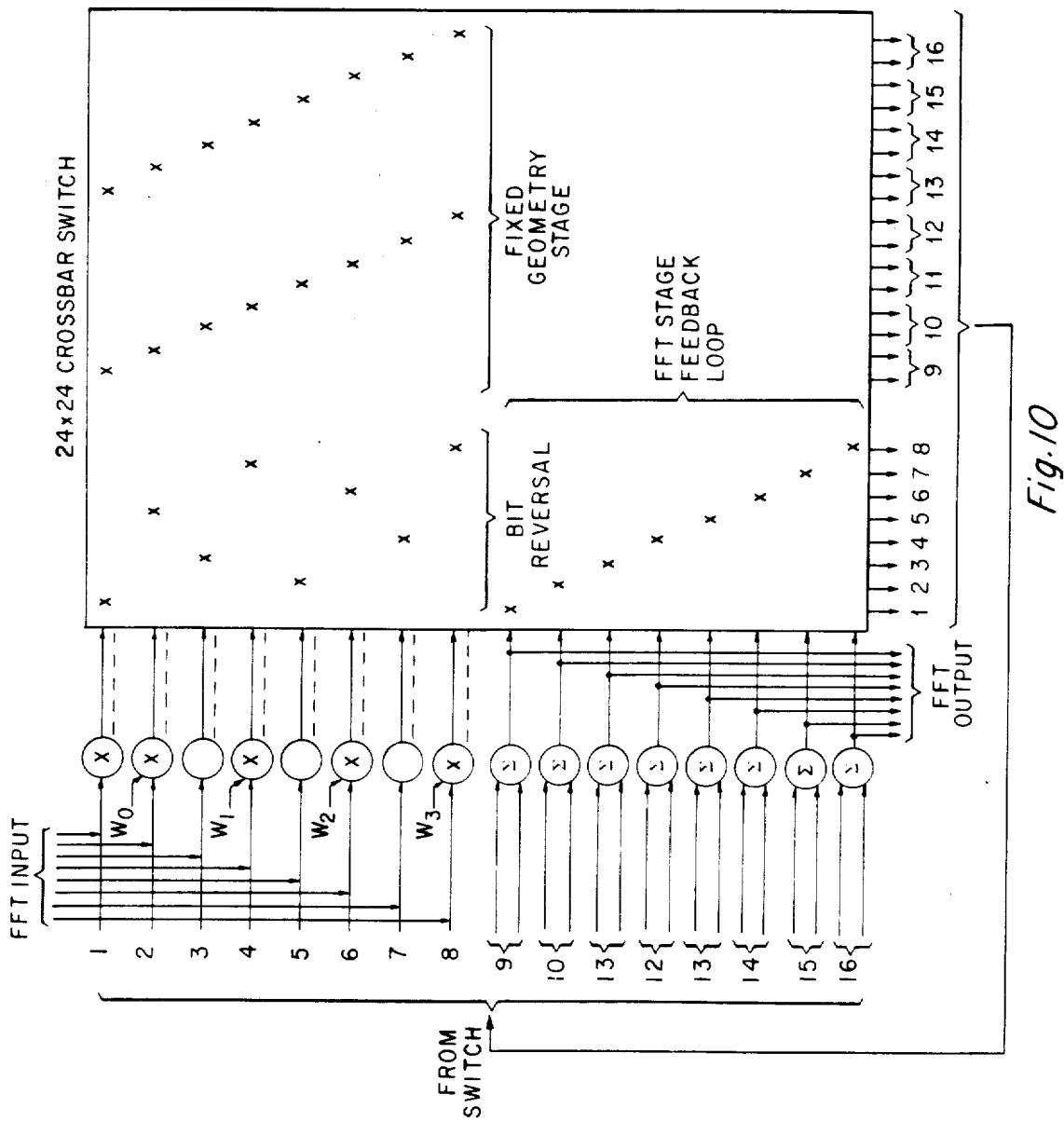

FIG. 10 shows the FFT implementation on a 24 by 24 crossbar switch 102. The FFT input is fed into processors P1 through P8, which pass the data through to crossbar switch 102 (i.e. multiply by one). The left upper quadrant of the switch converts the data to the bit reversed sequence as required in FIG. 9B and returns it to processors P1 to P8. The first set of weights w are used for the first loop of the FFT stage, FIG. 10C. The crossbar switch 102 is then reset to turn off the left upper quadrant and turn on the top right and lower left quadrants for the iteration loops. Now the data is passed via the top right quadrant of crossbar switch 102 which implements the fixed configuration FFT graph, to the adders, processors P9 through P16. The lower left quadrant of crossbar switch 102 is used to return the data to processors P1 through P8 for the next loop of the FFT. After $\log_2 N$ loops the output is taken from the adder processors P9 through P16.

Figures 11A, 11B:
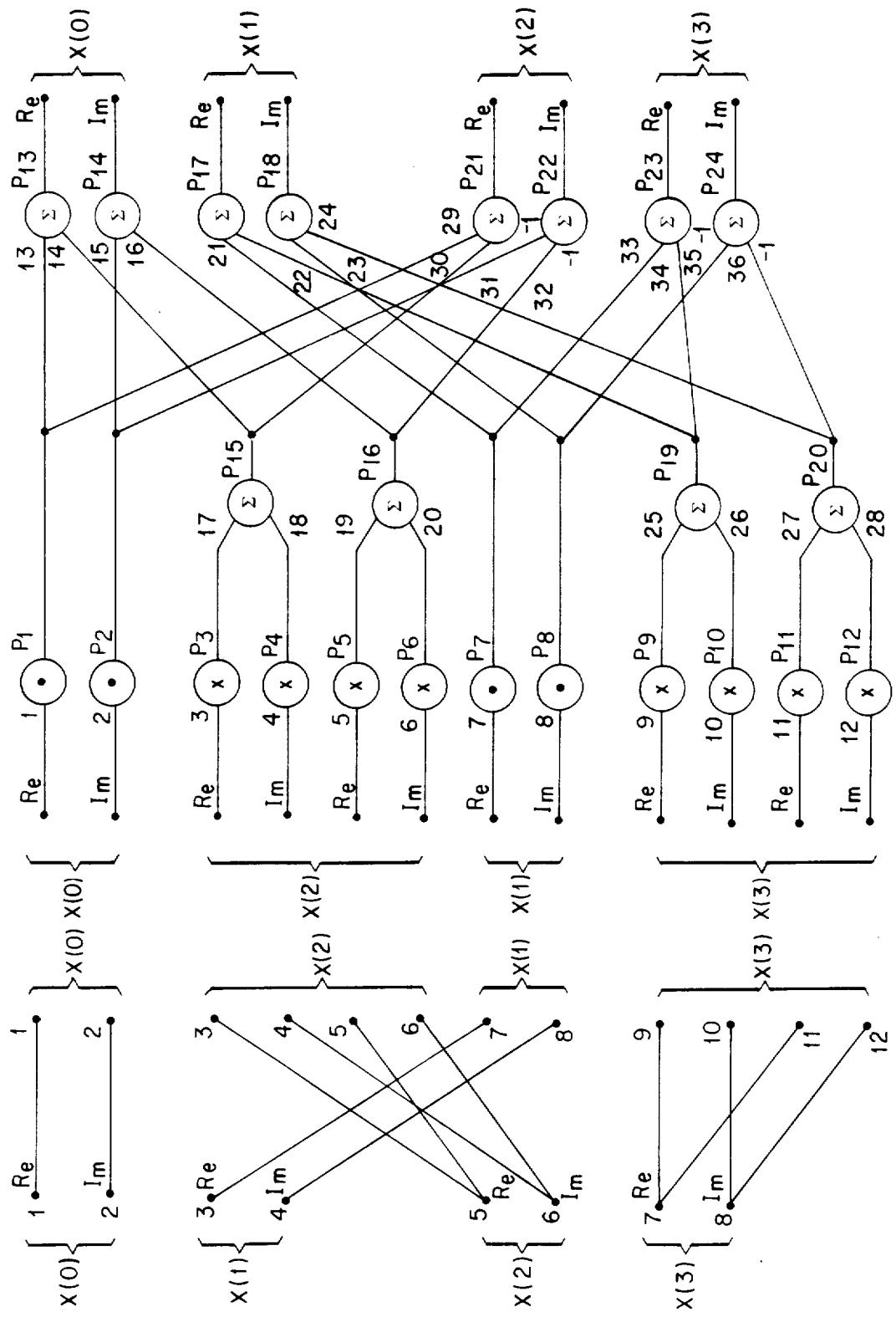

Complex multiplication and complex addition is performed sequentially in each loop of the FFT; but complex multiplication takes much longer than comples addition. Even interleaving two FFTs does not permit high efficiency because of the disparity in complex multiplication and addition computation times. Separation into real and imaginary parts can overcome this disparity, and FIG. 11 illustrates a four point FFT flow graph which separates the real and imaginary parts and requires eight multipliers, twelve summers and a thirty-six by thirty-six crossbar switch. The computation proceeds as follows: the first cycle rearranges the order of the sequence to be transformed (FIG. 11A). Next, the crossbar switch is reset for iteration loops each with one multiply and two add cycles which involve similar computation times. Consequently, three FFTs could be interleaved and computed to permit all three cycles simultaneously computing on different transforms. Table 1 shows the crossbar switch settings for the flow.

Correlation and matrix-vector multiplication

Figure 12A:
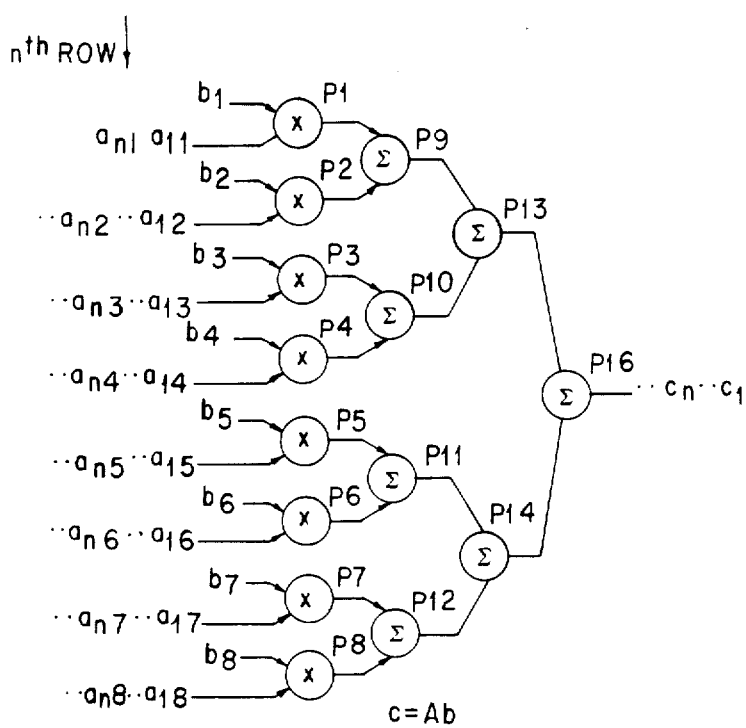
FIGS. 12A-B schematically illustrate the flow and crossbar switch settings for doubling algorithm for correlation and matrix-vector multiplication.
Figure 12B:
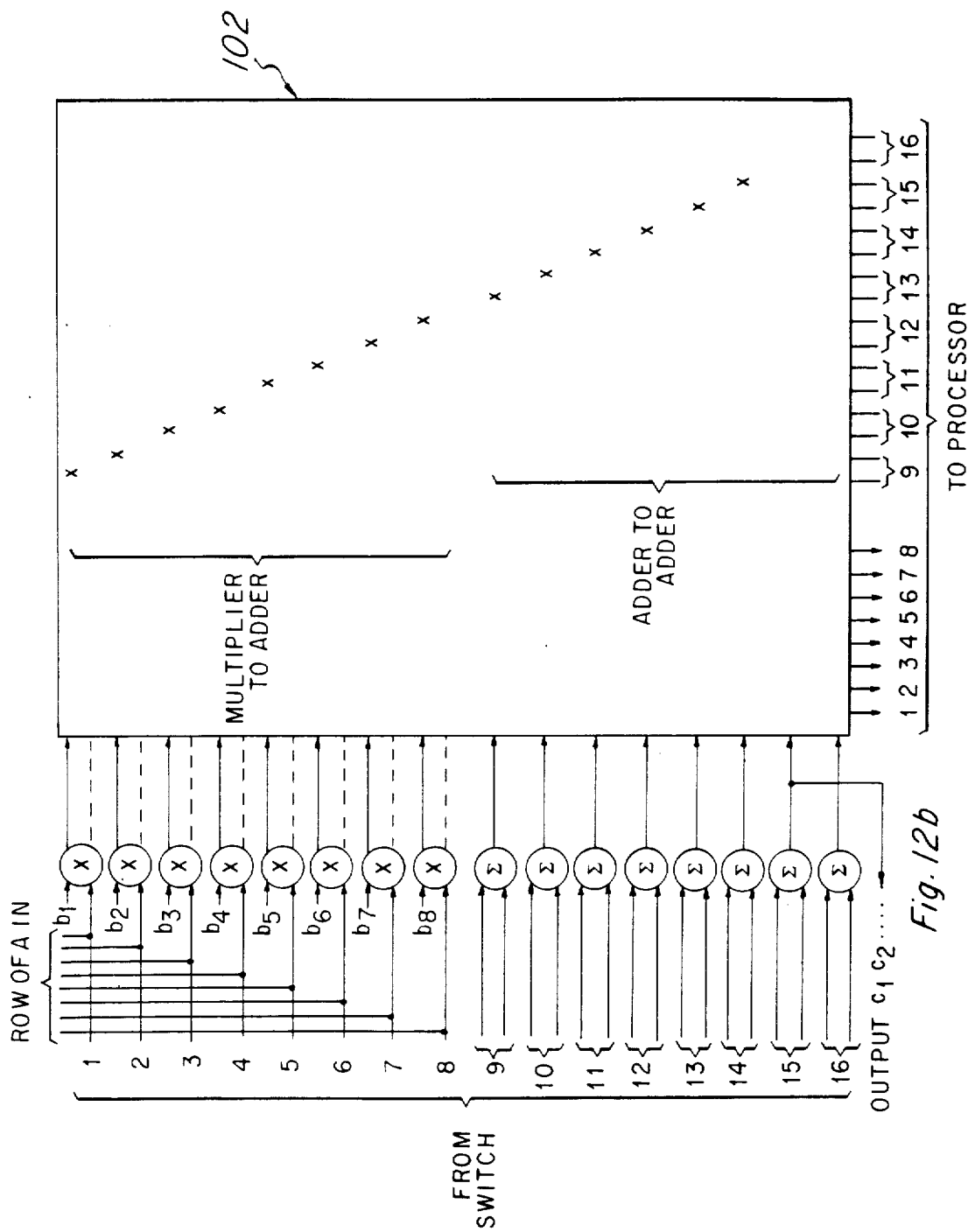

FIG. 12A shows a graph for correlating many vectors against a template vector b in the time domain, equation (2), by means of recursive doubling. The vectors may be considered rows of a matrix A in a matrix-vector multiplication. While one vector is being multiplied in processors P1 through P8 the results of the preceding multiplication are being summed in processors P9 through P12, the results of the second preceding multiplication are being summed in processors P13 and P14, and the results of the third preceding multiplication are being summed in processor P15. Note that processor P16 is not used. A value of the output vector for the matrix-vector multiplication is obtained at each compute-move clock cycle. FIG. 12B shows the implementation on the computer of FIG. 3. In this case a 16 by 24 switch would have been adequate. The latency for this implementation is $\log_2 N$ as distinct to N for a systolic array mode. A parallel input is now required and multiple vectors must be correlated in order to fill the pipeline. Problems arising from taking a Fourier transform are also avoided.

Autoregressive modeling for spectral analysis

Autoregressive modeling is selected because it is widely used in speech, underwater acoustics, sonar.radar and seismic processing. Autoregressive modeling (AR) is generally equivalent to optimal least square or Wiener filtering, linear prediction (LP), and maximum entropy method (MEM). The purpose of modeling is to represent a time series by a small number of autoregressive parameters (all pole model) from which the time series could be regenerated within a least square accuracy by passing white noise through the model. Passing the time series through an inverse filter of the model would therefore remove the information for the time series and leave white noise. The AR parameters consequently contain the information for computing the spectrum of the times series, i.e., its color. The AR parameters may also be viewed as linear prediction coefficients (LPC) because a FIR or MA filter with these coefficients will predict the next value of a time series from a number of past values. Subtracting the predicted value from the actual value gives white noise as in the case of applying the inverse AR filter. The $m^{th}$ order LPC $a_k$, $k=1$ to m. enable the time series value at time j to be predicted from past values $$\tilde{x}_j = \sum_{k=1}^{m} a_k x_{j-k} \tag{4}$$

and are computed so as to minimize $$\sum_j (x_j - \tilde{x}_j)^2 \tag{5}$$

Three applications are mentioned. In Geophysics, reflection signals from the earth are considered random. The response measured at the surface is the convolution of the source wavelet and the random earth sequence. The effects of the source wavelet are removed from the sensor data by predictive deconvolution, i.e. the colored information in the spectrum is removed: see McAulay, Predictive Deconvolution of Seismic Array Data for Inversion, IEEE Int. Conf. Acoustics, Speech and Signal Proc. (March 1985).

In the second application a 200 sample segment of speech may be represented by 16 linear prediction coefficients (AR parameters) as this many poles is adequate for modeling the spectrum and for recognizing that segment. In this case, the compression of the data from 200 to 16 numbers acts as a feature extraction permitting much faster computation in following stages.

The third example relates to obtaining the spectrum S(w) from the AR parameters, $a_k$, $k=1$ to m, and energy v using $$S(w) = \frac{v}{1 - \sum_{k=1}^{m} a_k e^{-jwk \cdot 2}} \quad (6)$$

The assumption that data is zero or repeating outside the measured region is made in FFT's but avoided when computing the spectrum from AR models.

The previously mentioned approaches such as AR, LP and MEM lead to the following steps for determing the AR parameters or LPC. Estimate the autocorrelation function $$R_{xx}(\tau) = \frac{1}{m-1} \sum_{k=1}^{m-1-\tau} \frac{x_k x_{k-\tau}}{R_{xx}(0)}. \quad \tau = 0 \text{ to } m \quad (7)$$

for the time series. Solve for the AR parameters or linear prediction coefficients a, $a_k$, k=1 to m in the equations $$Ra = b \quad (B\ 8)$$

where R is a Toeplitz autocorrelation matrix formed from $R_{xx}$. This is normally performed on a sequential processor using Durbin's or Levinson's algorithm. However, Schur's algorithm is generally considered more convenient on a parallel machine; see S. Kung and Y. Hu, A Highly Concurrent Algorithm and Pipelined Architecture for Solving Toeplitz Systems, IEEE Trans. Acoustics, Speech and Signal Proc., ASSP-31 (1983).

The matrix R is decomposed into a product of lower and upper triangular matrices.

$$R = U^T U \quad (9)$$

Substituting into equation (8) permits solution in two steps. Solve for g from $$b = U^T g \quad (10)$$

and solve for a from $$g = Ua. \quad (11)$$

The autocorrelation function in equation (7) may be computed using the tree correlation of FIGS. 12A-B. In this case, the data is set in the multipliers, assuming a sufficient number of processors, and then a copy of this data delayed by an amount equal to the maximum desired lag is fed from the top. At each step a correlation is performed at one lag less until the delayed data stream is in exact alignment with the original data. This provides the zero lag autocorrelation coefficient.

Figure 13:
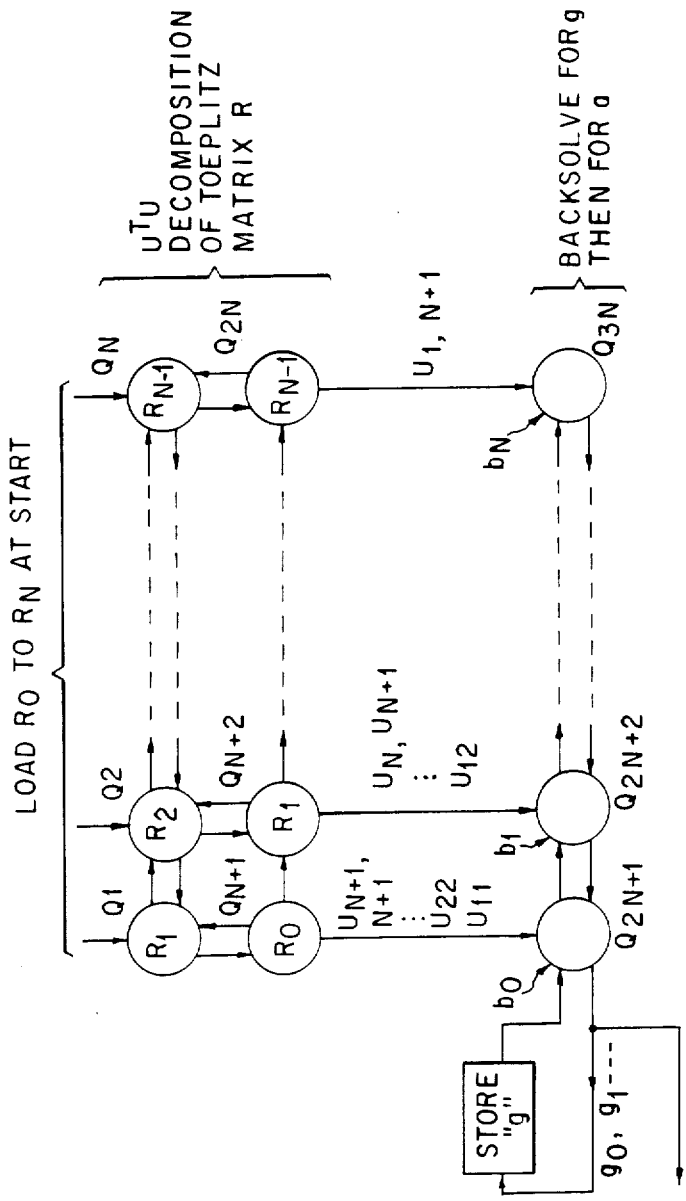
FIG. 13 schematically illustrates parallel computations of linear predictive coefficients by Schur's algorithm.

The autocorrelation coefficients, $R_0, R_1, \ldots, R_N$, are fed into elementary processors $Q_1, Q_2, \ldots, Q_{2N}$ in the systolic array as shown in FIG. 13 as they are computed. This array uses Schur's algorithm to compute the AR parameters or LPC for the time series and invokes a set of elementary processors of computer 100 different from the ones used for the autocorrelation coefficient computation. (Of course, rather than feeding the autocorrelation coefficients into elementary processors as they are computed, the autocorrelation coefficients could be stored after computation and crossbar switch 102 reset to use the same elementary processors in the systolic array.) The upper triangular matrix U is computed and then used in the lower systolic array to compute g and then a. While g and a are being computed the upper two rows of processors could be starting on computing the AR parameters for the next time series. Note that the elementary processors $Q_1, Q_2, \ldots, Q_{2N}$ are interconnected with up to four inputs and three outputs; this is more complicated than illustrated in FIG. 3 and requires a larger crossbar switch as indicated in FIG. 1.

Computer 100 (or more generally, computer 30) as a signal processor can provide multi-Gigaflop performance, and spatial light modulators of the cantilever beam type should lead to large fast crossbar switches of a size, speed, and cost that conventional semiconductor technology is unlikely to match. In effect, algorithms are reduced to maximally parallel directed graphs which are mapped to the signal processor. Programmed data flow is used to minimize overhead during execution. Implementations of filtering, convolution, correlation, fast Fourier transforms and matrix-vector multiplication have been illustrated. The full reconfigurability of the crossbar switch permits high speed efficient implementations of complex algorithms and make possible automatic mapping of new algorithms to computer 100 or computer 30.

Symbolic Processing

The optical crossbar connected parallel elementray processors also may form a symbolic computer or a mixed symbolic-numeric computer. For symbolic computing the elementary processors include logic gates, comparators, and so forth. Thus in FIG. 4 the ALU multiplier 125 would be replaced by or supplemented with logic gates, pattern matching or other symbolic processing functions; this comprises the second preferred embodiment computer which is described in connection with the following applications.

Rule based expert systems

A widely applicable and straightforward form of expert system is one in which the information is contained in procedures in the form of 'If-then' rules. There are many real time applications in which rapid inference is required and for which the proposed processor is suitable. Applications include speech, vision, industrial plants, robotics, and weapon systems. In forward chained rule based systems, a set of observations are made and a probability of correctness is assumed for each. The inference engine rapidly identifies status, surroundings or threats and indicates appropriate action. In backward chaining rule based systems a goal is hypothesized and this is subdivided into requirements to meet this goal. These are further subdivided. Prolog is a comaputer language that operates in this manner. Forward and backward chaining are illustrated later. In both forms, parallelism is needed to achieve fast response. Hard wiring a system involving an interconnected set of logical rules and probabilities would not be economic because the rule may vary or be need to be changed for new situations. The speed and reconfigurability of the proposed optical crossbar switch is required. The simple systems considered here invoke propositional calculus and do not address the more sophisticated first order predicate calculus required in more complex applications.

Forward chaining example and implementation

Figure 14:
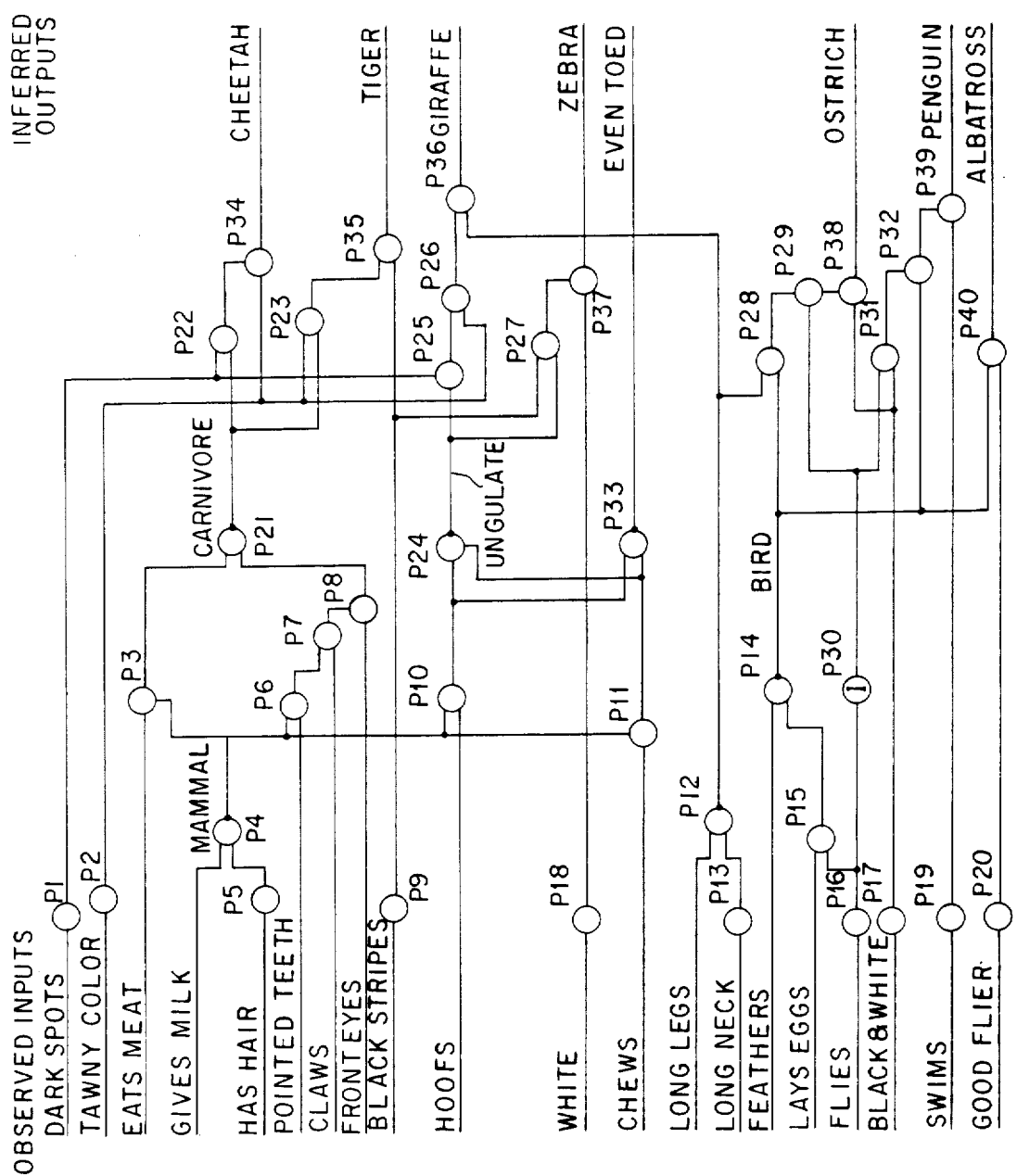
FIGS. 14-15 illustrate forward and backward chaining rule based graphs.

FIG. 14 shows a directed flow graph for the identification of seven animals based on 20 observed features. This example and its explanation follow that given in Winston. Artificial Intelligence (Addison-Wesley 1984). A simplified explanation is possible if we assume observations are each true or false with no assigned probabilities. The elementary processors (labelled P1 to P40) are AND gates represented by circles, Or gates represented as circles with black dots, and an inversion gate represented as a circle with an"I". An output will be TRUE provided the inputs corresponding to this animal are true. If-then rules characteristic of rule based systems are illustrated, for example, at processor P3, 'if the animal is a mammal and eats meat, then it is a carnivore'. The OR gate at processor P21 indicates an alternative manner of infering that it is a carnivore, 'if the animal is a mammal and it has pointed teeth and it has claws and it has forward pointing eyes, then it is a carnivore'.

In the case of interest, the observations have probabilities of correctness associated with them. Assuming independence, the joint probability of two events is the product of the two event probabilities. Consequently, the processors marked with an empty circle and no black dot multiply the two incoming probabilities. These processors are referred to as type A later. Note that an output of zero corresponds to a logical false and is obtained if either input probability is zero. The circles with black dots, referred to later as type B, determine the maximum of the incoming probabilities. An alternative equation is provided in Winston. Type C processors subtract the incoming probability from one. All three processor types also have a probability mapping function modifying the output. The function maps the computed input probability to an output probability between 0 and 1.

The flow graph of FIG. 14 may be implemented directly on a systolic system like that shown in FIG. 1 in which the first twenty processors have input connections and the last eight processors output connections. Only 40 processors are needed for the simple example shown. Processors are programmed to act as type A, B or C as shown in Table 2. The observed inputs are entered into the first 20 processors. P1 to P20. Probabilities are obtained at the outputs of the last seven processors and the highest indicates the the animal identified. A confidence factor clearly relates to the size of probability and amount it exceeds that for the other animals. Table 2 shows which of the crossbar switch elements must be activated to provide the interconnections between the rules shown in the flow graph of FIG. 14.

Backward chaining rule based implementation

Many applications are more suited to backward chaining than forward because the user is interested in resolving a specific hypothesis or goal. Data may be difficult to obtain and the user does not wish to direct his efforts to obtaining unnecessary observed data. A legitimate question to ask the expert system represented by FIG. 14 is "Is the animal a Cheetah?". This involves reading the flow graph FIG. 14 from right to left. The goal is met if at processor P34 the animal has a tawny color and for P22 has dark spots and it is a carnivore. The advantage of backward chaining is that it indicates which features need to be observed and no time is wasted in obtaining other irrelevant data.

Figure 15:
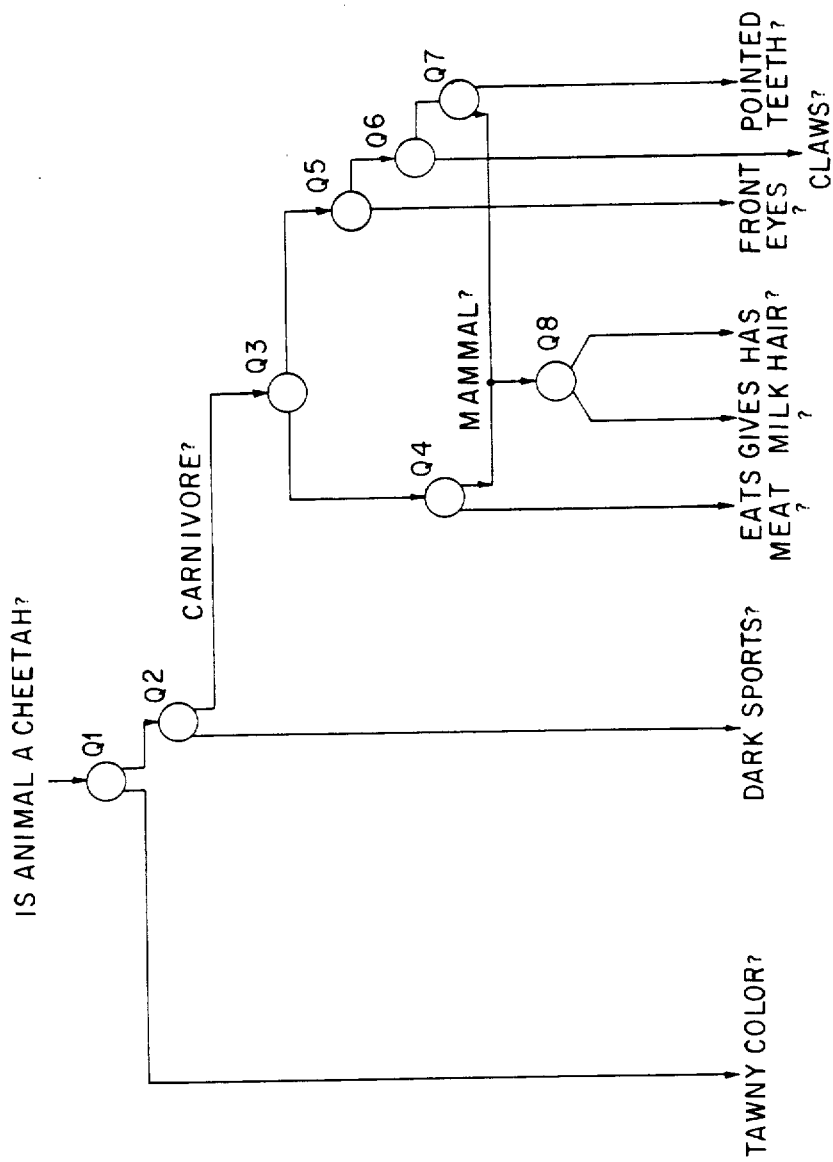

Implementation on an optical crossbar interconnected processor requires the backward extraction of a tree leading to the hypothesized goal. FIG. 15. Processors are assigned numbers Q1 to Q8 are shown. Any data that is known is set into the processors as true information. The crossbar switch is set to the tree configuration. It may be prudent to set the crossbar switch for a number of trees involving differing sets of elementary processors on the assumption that further hypotheses are forthcoming. A signal enters processor Q1. At each circle, representing a backward AND gate (recall Q1 relates to P34 in FIG. 14). the signal is transmitted in both output directions. At the circle with a black dot, representing backward OR gates, the signals are tagged with the OR gate number and the limb of the OR gate. At any processor, if all of the outpouts are already marked true there is no need to proceed further in that limb. Alternatively, the processor may output further questions in the user such as, "Is the animal a carnivore?". Eventually, the signals filter through to the base indicating what information is required to ascertain whether the animal is a Cheetah. The output indicators are also tagged so that the machine may interpret the output to provide alternative combinations that the user must satisfy to confirm that the animal is a Cheetah.

Simultaneous symbolic and numeric computation, speech example

Advantages of coupling symbolic and numeric processing

It is possible to simultaneously perform signal processing and logical inferences and to couple these via the crossbar switch. This has the advantage that signal processing outputs may be used directly in the inference and inference outputs may trigger specific computations as needed to complete the inference step.

A practical method of computing these would allocate the upper section of processors to inference and the lower section of processors to signal processing. The crossbar switch is divided into four corresponding segments, the upper left for signal processing and the lower right for symbolic computation. The other two segments permit communication at any stage between the symbolic and numeric computations. Thus the third preferred embodiment has a set of elementary processors with arithmetic functions (the ALU/multiplier 125 in FIG. 4) and another set of elementary processors with symbolic functions (the ALU/multiplier 125 in FIG. 4 replaced with symbolic functions such as logic gates). Of course, a more expansive approach would be to have both arithmetic and symbolic functions in all elementary processors.

Faster symbolic and numeric processing are required in geophysical exploration to make real time processing and interpretation possible. Signal processing is used to clean up the data and remove the source signature: see A. McAulay, Predictive Deconvolution of Seismic Array Data for Inversion. IEEE Int. Conf. Acoustic. Speech and Signal Rec. (March 1985). Moedling and inversion (see MaAulay, Prestack Inversion with Plane Layer Point Source Modeling, 50 Geophysics 77-89 (1985) may then be used to provide direct estimation of earth parameters. The selection of parameters for controlling these computations and the mathematical derivation of the equations require symbolic computation. Rule based expert systems are required for intereparation and must communicate with the signal processing so that in a backward chaining mode a specific hypothesis may be confirmed by specific re-processing of selected data.

A symbolic-numeric speech recognition and parsing system

Figure 16:
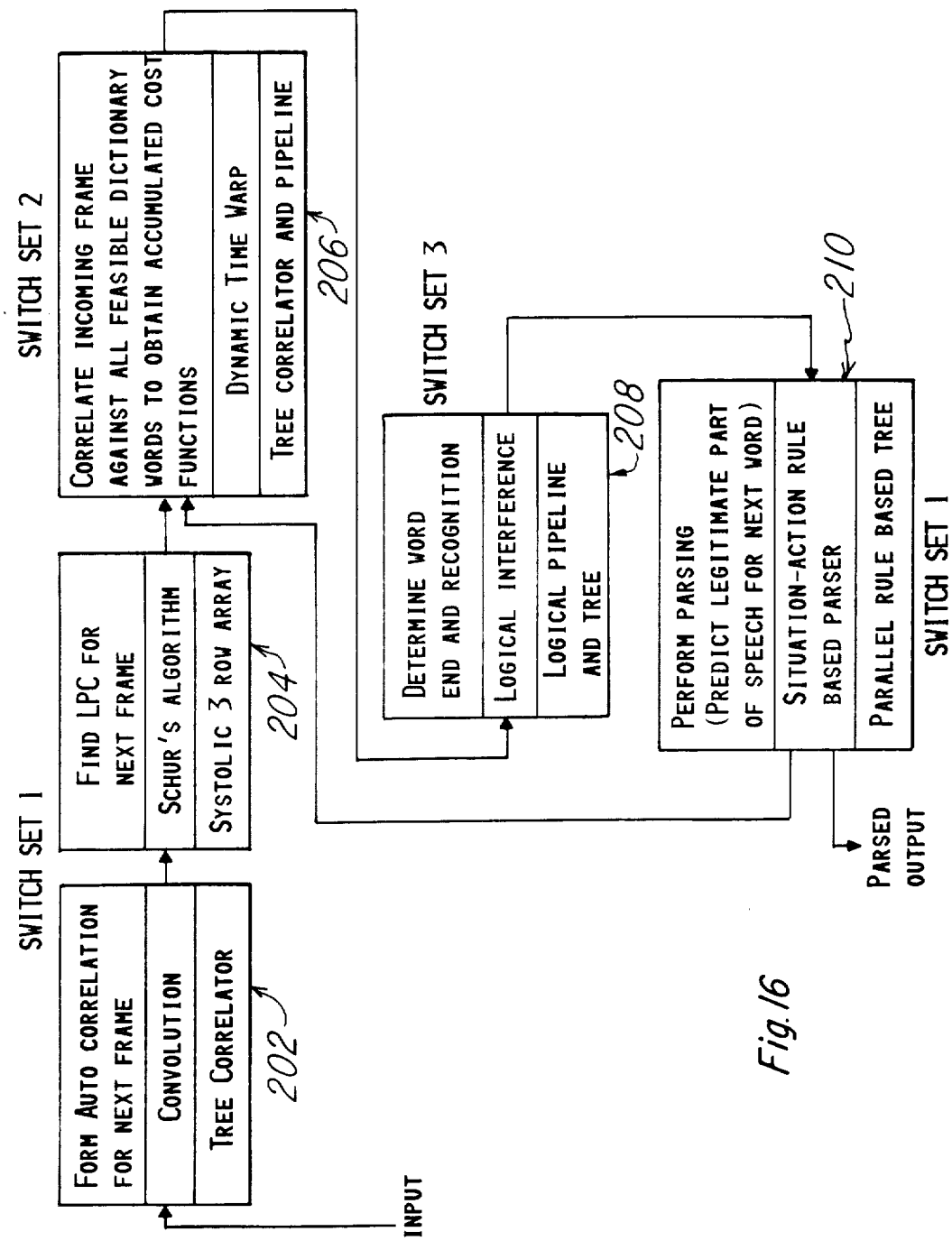
FIG. 16 illustrates speech recognition with embedded systolic parser.

A symbolic-numeric speech recognizer illustrates the advantages of performing simultaneous numeric and symbolic computation. FIG. 16 shows a block diagram for a speech recognizer with an embedded parser. Each block is subdivided into three parts: the top part contains a description of function performed, the middle part is the algorithmic approach used, and the bottom part is the architectural implementation set by crossbar switch 102. The difficult problem of speech recognition is greatly simplified for the purpose of illustrating the principles involved. First presume that spoken data is entered continuously and sampled; the sampled data stream is partitioned into 20 millisecond frames, each frame having 200 samples. The preferred embodiment operates on a continuous stream of frames, unlike most systems which operate on batches of frames in a batch mode. This avoids complications associated with interfacing the batches. In FIG. 16 the first two functional blocks, 202 and 204, reduce the data for a single frame from 200 samples to 16 linear preduction coefficients (LPC) using the AR modeling techniques described previously. A parallel implementation with the optical crossbar interconnected elementary processors provided previously in FIG. 13. Normally, further stages would be used to improve the values representing the speech on the basis of heuristics. In practice, if there are N data samples per frame and M LPC coefficients, then the correlation takes only N/M times longer than the next stage. Therefore, for efficiency of processor utilization, an N/M wide tree may be used M times over.

After the 20 msec frame is reduced to 16 LPC, the crossbar switch is reset for dynamic time warping which is used to identify or calssify incoming words from members of a dictionary by correlating the LPC for incoming signals against dictionary reference PLC templates as indicated in functional block 206 of FIG. 16.

The crossbar switch is reset against to configure the computer as an inference machine as indicated in functional block 208. A set of simple rules is used in a rule based system to make decisions regarding the end of a word and the start of the a new word.

Symbolic parsing in the form of a situation-action wait and see rule based system utilizes rules of language grammar to predict the feasible parts of speech for the next word, thus reducing the number of words in the dictionary that must be considered and also helping to resolve ambiguities in recognition. This is implemented on the computer by another resetting of the crossbar switch as indicated by functional block 210 in FIG. 16.

Parallel dynamic time warping and sumbolic parsing are described in the following together with their implementation with the optical crossbar switch. Note that the crossbar switch is reset three times during each frame. The first setting corresponds to computing the LPC and making logical inferences for the rule based parser, the second is for detemining accumulated cost functions for each reference word during dynamic time warping, and the third for determining the end of word and classifying it.

Speech recognition by dynamic time warping

Figure 17:
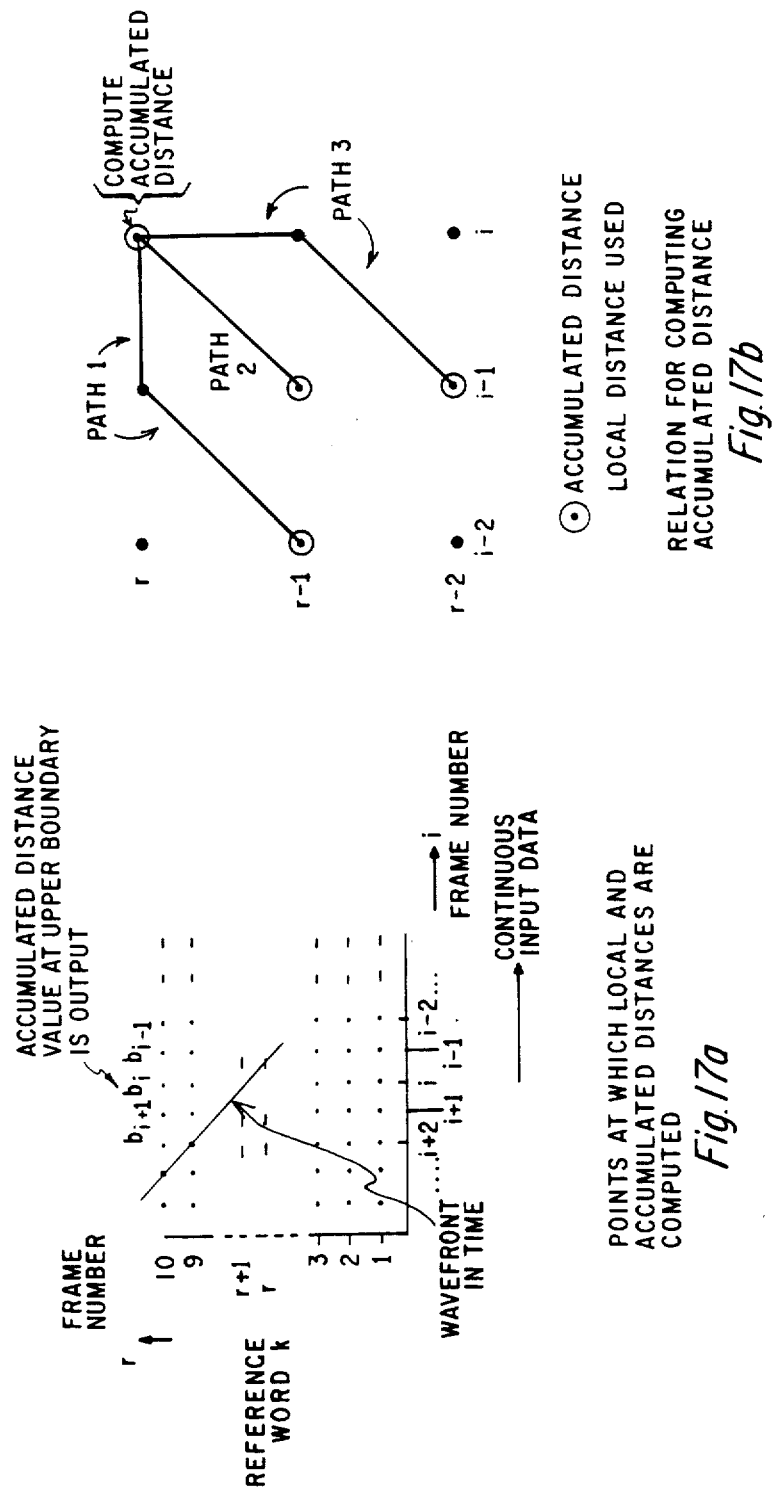
FIGS. 17a-b illustrates dynamic time warp principle.

As illustrated in FIG. 16, the LPC for a frame of the incoming data, of unknown stretch, must be correlated with each frame for every feasible word in a dictionary of LPC templates. FIG. 17A shows input data LPC frames, labelled ..., i−1, i, i+1, ..., in x direction and kth reference word LPC frames in y direction. The dictionary of reference templates is separated into sub-dictionaries according to parts of speech. Words that may arise as more than one part of speech are included in separate subdictionaries. The symbolic parser is used to predict parts of speech that could not follow because of rules of grammar. Those subdictionaries that contain parts of speech that would not be consistent with the grammar need not be correleated, and this saves time for the local distance and dynamic time warp stages.

Typical local distance measures are $$d_{i,r} = \sum_{n=0}^{L} i_n - r_n \tag{12}$$

and $$d_{i,r} = \log \sum_{n=0}^{L} (i_n \cdot r_n) \tag{13}$$

where L is the number of linear prediction coefficients, i is the input frame number which has LPC $i_1, \ldots i_L$ and r the reference templated number which has LPC $r_1, \ldots, r_L$.

The local distance, $d_{i,r}$ is computed simultaneously along the waveform seen in FIG. 17A as each new input frame arrives. The (i,r) point in FIG. 17A represents the corresponding $d_{i,r}$. A measure of the correlation between the incoming frames and the reference frames must be obtained in order to perform recognition. A stretch or shrink by up to a factor of two is permitted to each input frame to allow for the speaker's variation in speed relative to that of the reference. That is accomplished by computing an accumulated distance cost function along wavefronts as new input frames arrive. The cost function accumulates a running sum of local distances. FIG. 17B shows that the accumulated total is selected out of three possibilities which allow for shrinking, stretching or neither. This is expressed by the equation $$s_{i,r} = d_{i,r} + \min(s_{i-1,r-2} + d_{i,r-1}; s_{i-1,r-1}; s_{i-2,r-1} + d_{i-1,r})  \quad (14)$$

The accumulated cost functions as the top of the columns, FIG. 17A are used to determine whether a word has ended nd a match hass been obtained. Also the word in the dictionary or which the best match was obtained is identified.

Figure 18:
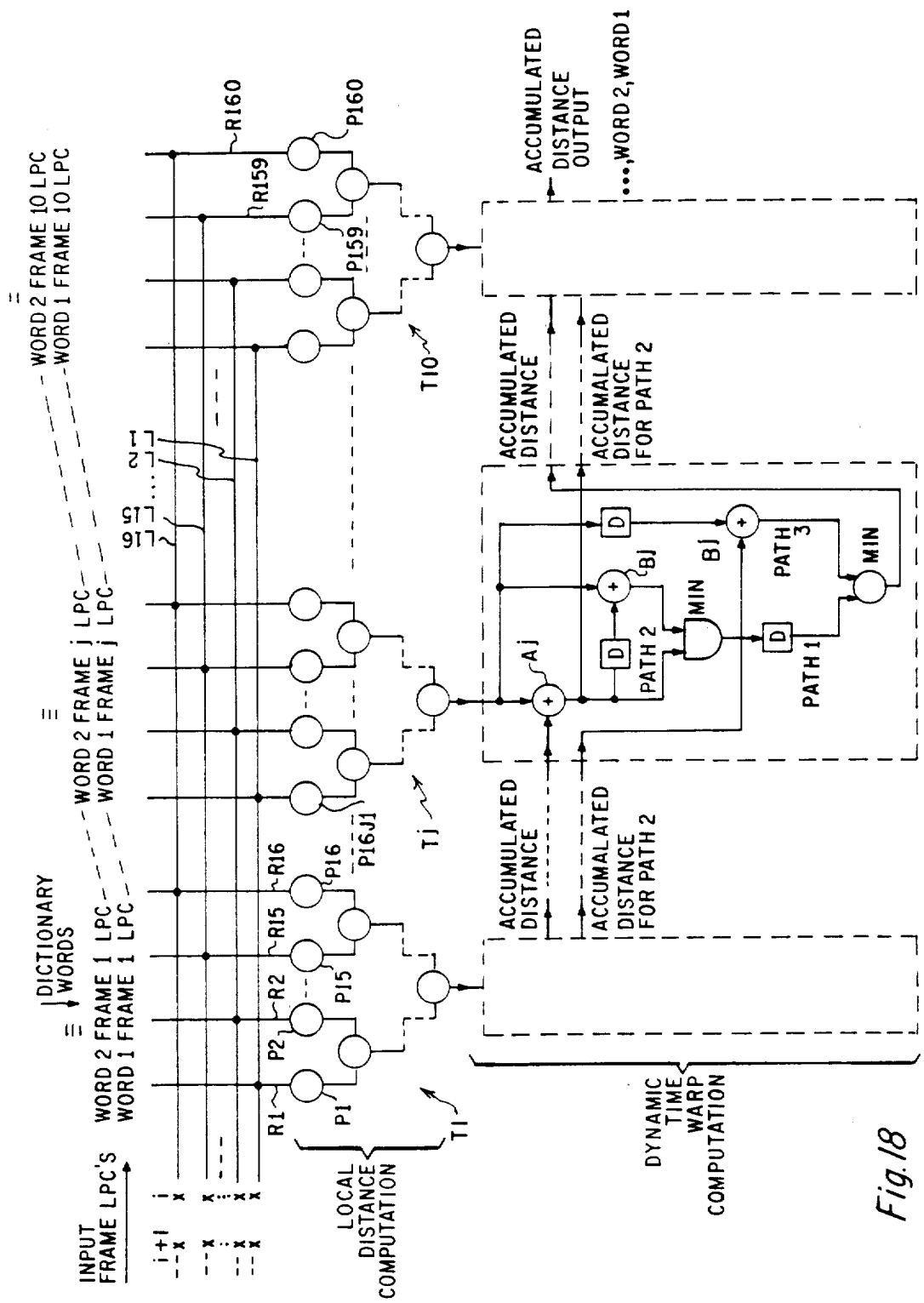
FIG. 18 illustrates a flow graph for continuous dynamic time warp algorithm.

FIG. 18 shows how the local distance and dynamic time warping could be computed with the optical crossbar interconnected parallel processors. The 16 linear prediction coefficients for the next input frame are loaded in parallel on lines L1, L2, . . . , L15, L16 (upper left portion of FIG. 18) to ten sets of 16 elementary processors P1, P2, . . . , P159, P160 (along the upper portion of FIG. 18) and will remain there until all reference words have been operated on. Reference words are stored as 10 frames for short words. (0.2 seconds), 20 frames for long words or 30 frames (0.6 seconds) for very long words. This permits the ten reference frames of a short word to be supplied via 160 input lines R1, R2, . . . , R159, R160 as shown in FIG. 18 and long words to be divided into two or three parts.

For simplicity, consider only reference words of ten frame length. The ten sets of 16 LPC (linear prediction coefficients) for the reference word are fed into the ten sets of elementary processors P1 to P160 via the high speed memory lines, and the trees T1, T2, . . . T10 of further elementary processors perform the subtraction and summation of equation (12) or the multiplication and summation of equation (13). The reference frames are staggered for a word to permit accumulation across all frames. That is, the 16 LPC for the word's $j-1^{st}$ frame center processors P16j-15 to P16j before the 16 LPC for the word's $j^{th}$ frame enter processors P16j+1 to P16j+16 so that the local distance between the input frame and the word's $j-1^{st}$ frame (plus the accumulation with earlier local distances from the input frame) is available for accumulation with the local distance between the input frame and the word's $j^{th}$ frame in adders Aj, Bj, and Cj as part of the dynamic time warp computation.

The output of trees T1 to T10 represents a column of local distance in FIG. 17A staggered in time. Following this in pipelined fashion are the values of local distance for all reference words. Then the pattern repeats over for the next input frame. The dynamic time warp program must be applied to correlate with each reference word separately. Consequently, in the following description delays must be sufficient to coincide with the time until the next input frame and the same reference word. In order to simplify the explanation, presume that only one reference word is used and the staggered pipeline output of the trees are columns of FIG. 17A for a single reference word. Accumulated cost function for three paths in FIG. 17B are computed in the flow graph via equation 14. Path 2 is computed by adding the local distance to the accumulated result at the previous time frame with one less reference frame. Path 1 is obtained by adding the accumulated value for path 2 computed at the previous time frame to the present local distance. Path 3 is computed by adding the accumulated path for the previous reference frame to the delayed present local distance. A delay is added in paths 1 and 2 in order to permit comparison of the three paths. The accumulated cost at the right end represents that at the top of the columns in FIG. 17A and is used to determine word end and identification of word. As mentioned earlier, for each input frame a set of values for every reference word or part of a reference word will flow out sequentially at the right end.

Figure 19:
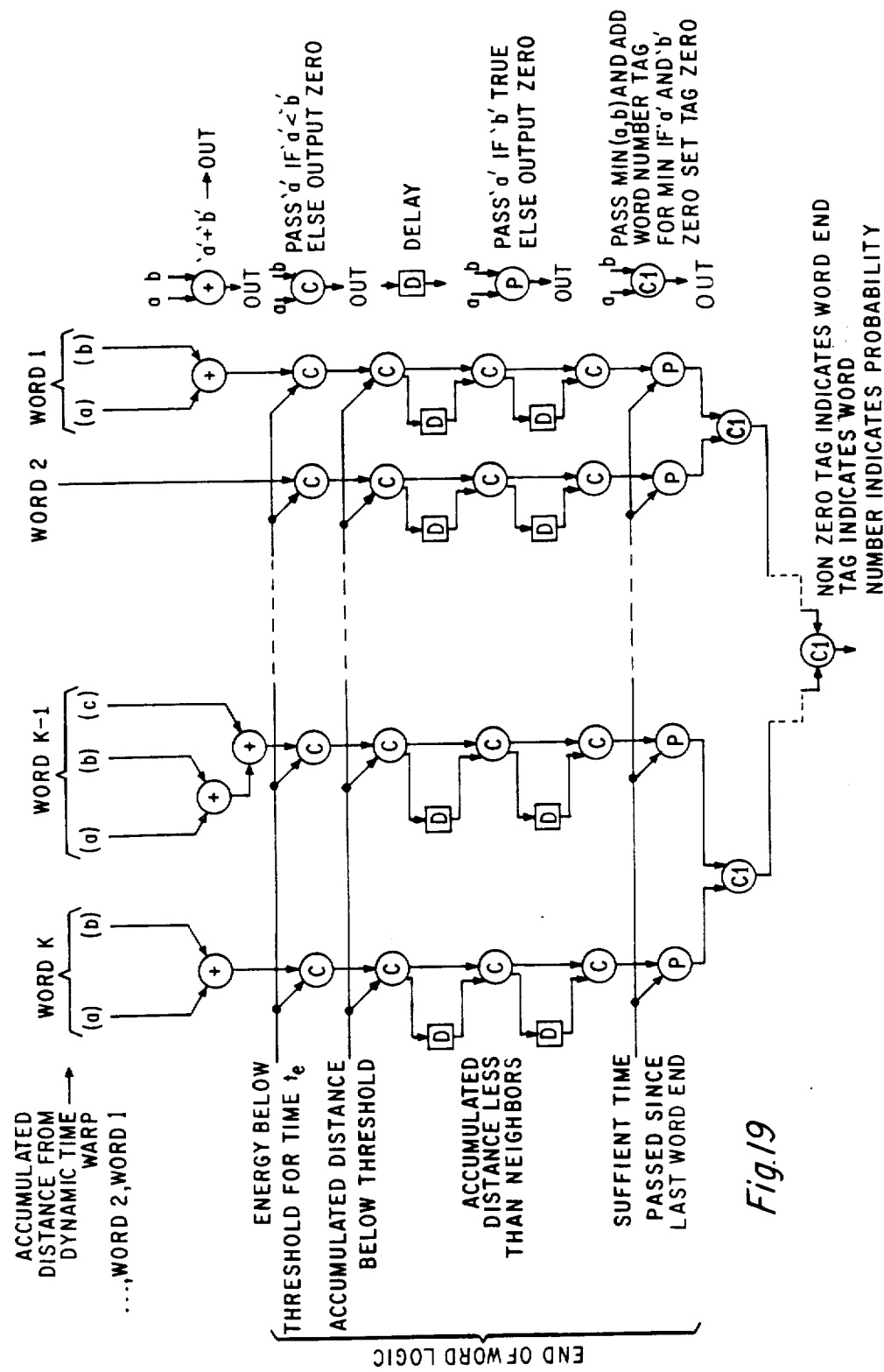
FIG. 19 illustrates a flow graph for word end determination and recognition.

FIG. 19 shows how the end of a word may be detected by means of logical inference. The stream out of FIG. 18 representing the accumulated costs for correlations for one input frame against frames for all references is passed into the top of the processor. The results of partitoned words must be added as shown for word 1. The cost function must pass through a set of logical operations to determine whether a word has ended at this point. Feasible rules are shown in FIG. 19. The energy must have been below a threshold for a short time, the accumulated cost must be below a threshold, the cost must be less than those at neighboring points and more than a certain number of frames must have passed since the previous word end. Any tests not met by the word result in a zero output. Comparison between words is now made. If a word passes the minimum test, relative to the other words it will filter down to the output together with its value and identification tag. A nonzero tag indicates the end of a word and the tag specifies the word. All accumulated cost functikons in the dynamic time warp computation are set to zero to start searching for a new word after an end of word has been detected. The word recognized and its possible parts of speech ares passed to the parser.

Speech parsing by situation-action wait and see parser

A vocabulary of over 10,000 words will have many similar words and it would be difficult to achieve good performance without utilizing rules of grammar to help distinguish ambiguities. If a situation-action parser is used such as the one described, phrases are assembled as new words are identified, so that it should be possible to predict the parts of speech unacceptable in the following word. This would enable a reduction in the number of dictionary words that the inoput must be correlate against during dynamic time warping. A larger vocaculary may now be accomodated or time is freed for other computations. The parser must operate at high speed for this to be useful. Parsing may be accomplished by switching the crossbar switch and activating pattern matching elements in the elementary processors. The specific parser considered is a wait-and-see parser (see P. Winston. Artificial Intelligence, 2d Ed (Addision-Wesley 1984)) which consists of a set of rules and actions to be taken when a rule is triggered. Approximately 500 rules could be implemented on a system such as that shown in FIG. 3. The set of thirteen rules described in Winston's book are used here to provide an illustration.

Figure 20:
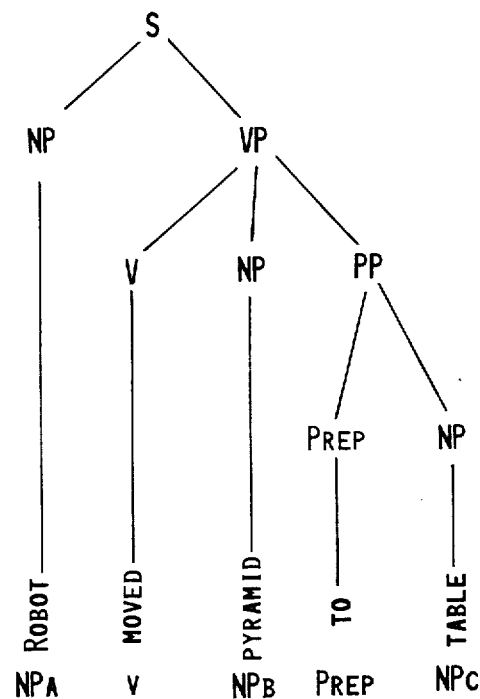
FIG. 20 illustrates a parse tree.

FIG. 20 shows a sentence to the parsed and the parse tree to be generated. A set of rules are used to generate the tree from the sentence, as described in Winston's book. Further rules would be required to predict unacceptable parts of speech. Also, for words that can be more than one part of speech, all parts of speech must be considred. If more than one satisfies it will be necessary to carry dual traces or store the states of the processor for backtracking should the parse fail later.

Table 3 illustrates the parsing sequence. Only two buffers, B1 and B2, are needed for this example, normally three buffers are required. Three stack nodes, K1, K2 and K3, are shown. The buffers and stack nodes have multiple registers and the contents of all registers are normally moved together. Words enter at the left and rules are triggered according to the contents of the buffers and the top stack node K1. Actions taken as a result of a rule being triggered include attaching buffer B1 to the item in stack K1 and shifting words right in the buffer to fill the space available in B1. A second action is to create a new node in K1 for starting a subtree, e.g., verb phrase (VP). The nodes in the stack are moved across to make room for the new node. The last action utilized in this example involves moving nodes from stack K1 to buffer B1 and shifting nodes in the stack to the left to fill the space left in stack K1.

Table 3 illustrates parsing a sentence in a sequence of 12 steps following Winston. A sentence phrase (S) is assumed in stack K1 at the start and the parts of speech for the sentence. FIG. 10, are entered into the buffers B1 and B2 from the left, starting with the first word in the sentence. The sentence rule at the right is triggered as K1 contains a sentence node and there is a noun phrase (NP) in buffer B1. The action taken is to move the NP to K1 and attach it to s. At the same time the incoming words are shifted right to refill buffer B1. Another sentence rule is activated in step 2, as indicated at the right, and this causes the stack to move down, K1-K2, and a new verb phrase node is set up in stack K1. At this stage we have completed a NP subtree of the parse and and are now starting on a VP subtree, FIG. 20. Steps 4 and 5 associate a verb and nou phrase with the subtree. Step 6 initiates initiates a preposition phrase subtree while retaining previously created subtrees in K3 and K2. Step 7 and 8 build up the PP subtree. The rule in step 9 enables linking of the PP under the VP and 10 and 12 link VP under a sentence S to provide a complete parse tree.

Figure 21:
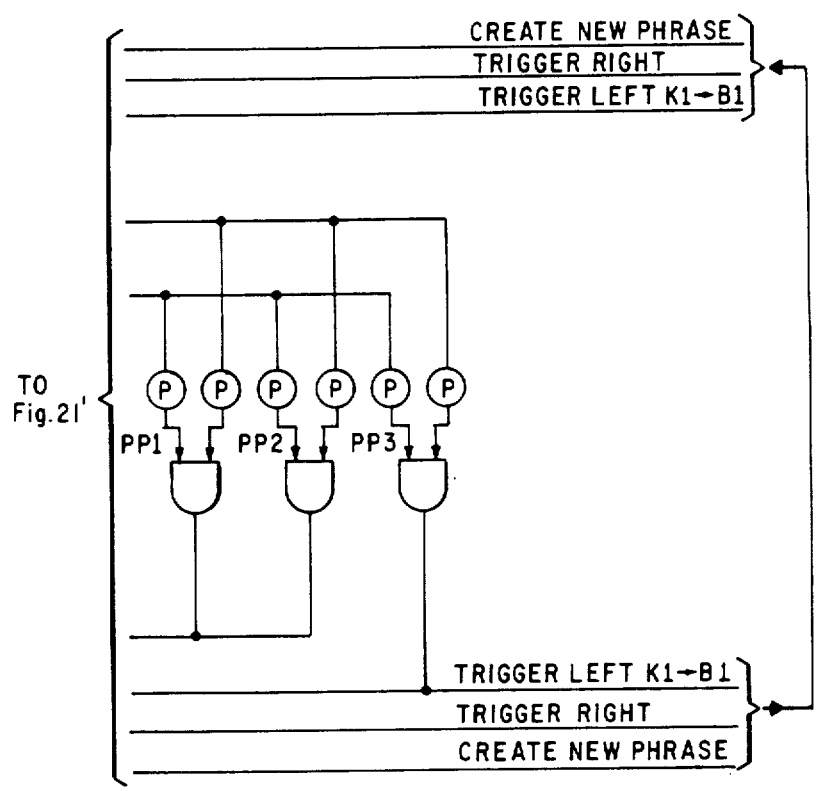
FIG. 21 illustrates a flow graph for a situation-action wait and see parser.

FIG. 21 shows, for the example of Table 3 and FIG. 20, a flow graph that can be mapped to an optical crossbar interconnected elmenary processors computer similar to that in FIG. 3. The thirteen rulexs S1 through S4. VP1 through VP6, PP1 through PP3, have inputs from the buffer registers and top stack register. On each clock cycle very rule attempts to match its stored patterns with those at its inputs. In this example, two matches are required to activate any rule, except for VP4 which requires three matches. Also, it is assumed that the rules are not ordered. Ordered rules may be accomodated by rearrainging the interconnections as in FIG. 14. Eight of the rules, when activated, cause an output trigger at the bottom left of that causes the buffers to progress including transfering B1 to attach to the bottom of the registers in K1. Rules S23 and VP4, when activated, cause the stack registers to be shifted right and a new phrase node to be generated and placed in K1. Rules VP6 and PP3, when activated, cause the stack registers to shift left including K1 into B1. Activation of rule S4 indicates parsing completion and reading out of the tree.

Description of diagnostic expert system

A simple medical expert system is selected for the purpose of illustration of another use of the crossbar switch because the knowledge domain is familiar to most people. A set of events or observations are obtained by asking a patient questions regarding his symptoms. The processor determined hypotheses or outcomes that represent possible illnesses. Example question may be "Is your temperature over 100 degrees?". Only yes-no answers are considered. It is straightforward to extend the system to graded answers from say $-5$ to $+5$. The dynamic range of deformable mirror devices is approximately 32 so that they can handle this range of information.

Databases of information exist for this class of problem. However, these are in the reverse from to that immediately useful. For example, the medical dictionary lists the symptons for each illness. It would be difficult to scan all illnesses to determined which are appropriate. However, the database may be used to establish a list of 'a priori' probabilities, $p(e_i|h_j)$, the conditional probability that an event of symptom $e_i$ will be present given a specified illness $h_j$. The expert system is then used to compute the 'a posteriori' probabilities, $p(h_j|e_i)$, the probability of a specified illness $h_j$, given a specified symptom $e_i$. After the patient has answered a number of questions, the illness or illnesses with the highest probabilities are the most likely hypotheses.

Bayes theorem provides an equation for obtaining the 'a posteriori' probabilities from the 'a priori' ones.

$$p(h_j|e_i) = \frac{p(e_i|h_j) * p(h_j)}{p(e_i|h_j) * p(h_j) + p(e_i|\bar{h}_j) * p(\bar{h}_j)} \quad (15)$$

where $\bar{h}_2$ is hot $h_j$, $p(\bar{h}_j) = 1 - p(h_j)$.

All the terms on the right side are known. The prior probabilities for the illnesses, $p(h_j)$, are known from statistics for the region and the patient profile. After the first question has been answered and the 'a posteriori' probability calculated the prior probability, $p(h_j)$, is replaced by the 'a posterior' probability, $p(h_j|e_i)$, for the next computation.

There is also a probability of occurrence of a specified event without a specified outcome occurring. This is $p(e_i|\bar{h}_j)$, the probability of the event given the hypothesis is untrue. For example, although having a temperature may be required for influenza, $p(e_i|h_j)=0.9$, say, there are many other illnesses involving a temperature. Consequently, the probability of having a temperature without having influenza could be, $p(e_i|\bar{h}_j)=0.3$.

If the patient answers yes to a question, equation (15) is used. If he answers no, the following equation is used.

$$p(h_j|e_i) = \frac{p(e_i|h_j) * p(h_j)}{p(e_i|h_j) * p(h_j) + p(e_i|\bar{h}_j) * p(h_j)} \quad (16)$$

Note that questions may be worded in such a way that $p(e_i|\bar{h}_j)$ is greater than $p(e_i|h_j)$. In this case, equation (15) is used for no answers and equation (16) for yes answers.

It is not possible to ask questions in random order because of the potentially large number of questions and the time it takes to ask and answer questions. The plant may explode or the patient die while this is being accomplished. Therefore, it is necessary to compute the best question to ask next. This is obtained by computing a sensitivity factor $s_i$ for the ith question that determines the influence that this question may have on the output.

$$s_i = \sum_{All\ j} \| p(h_j|e_i) - p(h_j|e_i) \quad (17)$$

The sensitivity factor $s_i$ is computed only for thos questions that have not yet been asked.

Flow graph for diagnostic expert system

Figure 22:
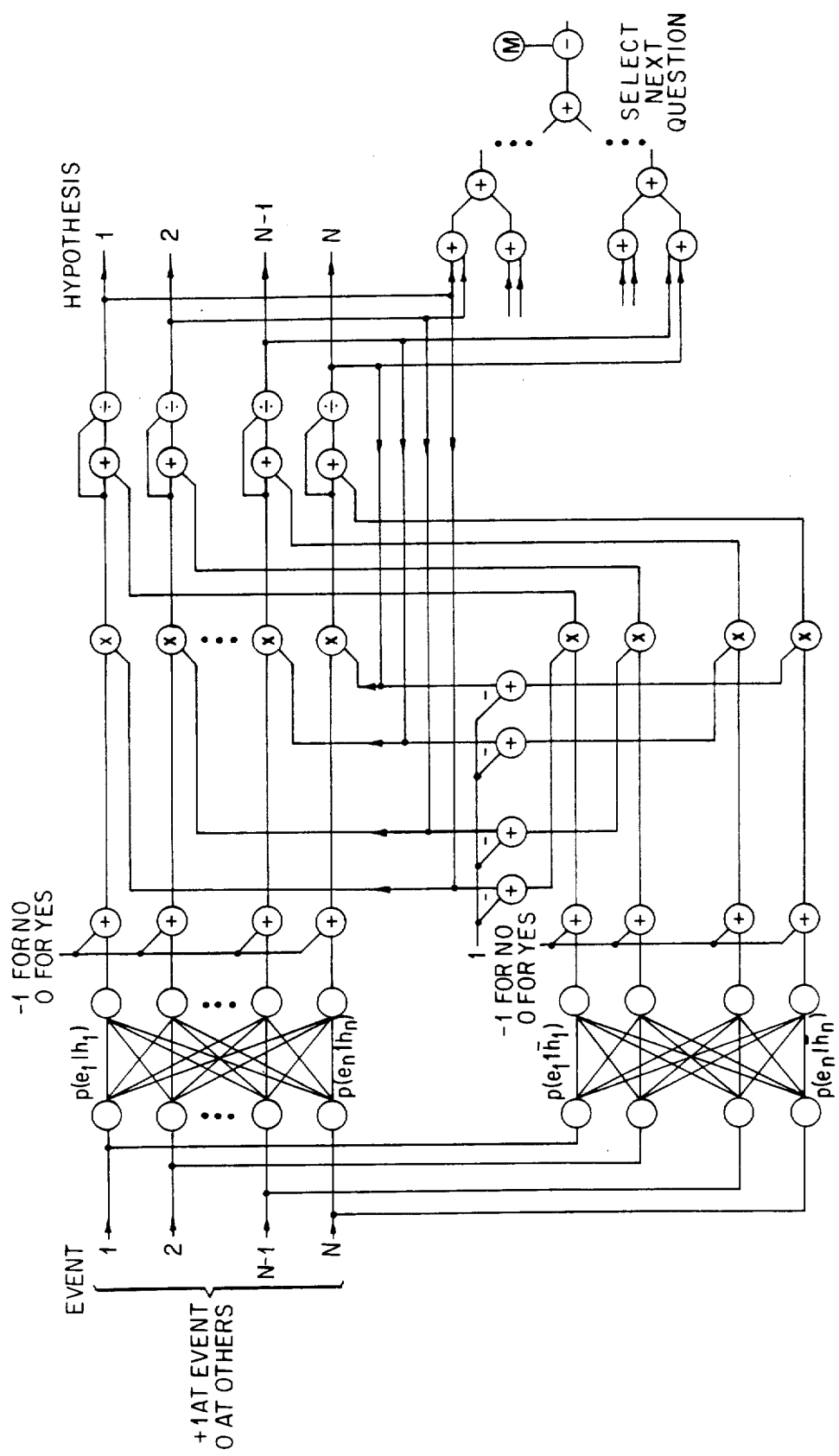
FIG. 22 illustrates a flow graph for a diagnostic expert system.

FIG. 22 shows the flow graph for updating the hypotheses (or illness probabilities) after a further question has been answered (symptom determined). The tree at the right hand side determines the best next question to be asked.

The answers are assumed to be yes and no only. If a response to the ith event or question has been received, a unit signal is entered at this input. All other inputs remain at zero. The signal enters an upper and a lower interconnection network. It is distributed to a number of outputs in the interconnection networks. The input is multiplied by $p(e_i|h_j)$ in passing to the jth output in the upper network and by $p(e_i|\bar{h}_j)$ in the second interconnection network. The outputs pass through a parallel set of adders in the case of a yes answer.

Equation (16) may also be written $$p(h_j|e_i) = \frac{[p(e_i|h_j) - 1] * p(h_j)}{[p(e_i|h_j) - 1] * p(h_j) + [p(e_i|h_j) - 1] * p(h_j)} \quad (18)$$

Therefore, in the case of a no answer a one is subtracted from the values at the parallel adders after the interconnection networks.

Parallel multiplication with the prior probabilities is performed in the parallel multipliers. The denominator in equation (15) or equation (18) is then formed ny summing the outputes from the upper part of the figure with those in the lower part. The division specified in the equations is now performed. The output represents the updated information regarding the preferred hypotheses, the largest value indicating the most likely hypotheses (or illness). These values are fed back to be used as the prior probabilities for the next computation.

The computation of the sensitivity factor for determining the next equation is performed by considering each of the questions that has not yet been asked. A unit input is applied at the left side of FIG. 22 for the not-yet-asked ith question. A yes answer is assumed and the output values for the hypothesis stored in the dividers or first line of adders in the right hand side. A no answer is then assumed and the output subtracted from that stored. The magnitude of the difference between the output for a yes answer and a no answer is summed over all hypotheses or outcomes by means of the tree at the right side to determine the sensitivity factor for that question. The question with the largest sensitivity factor is asked next. This operation requires high machine performance because it may have to compute $s_i$ for thousands of questions before asking the next question.

Spatial light modulator implementation for diagnostic expert system

Figure 23:
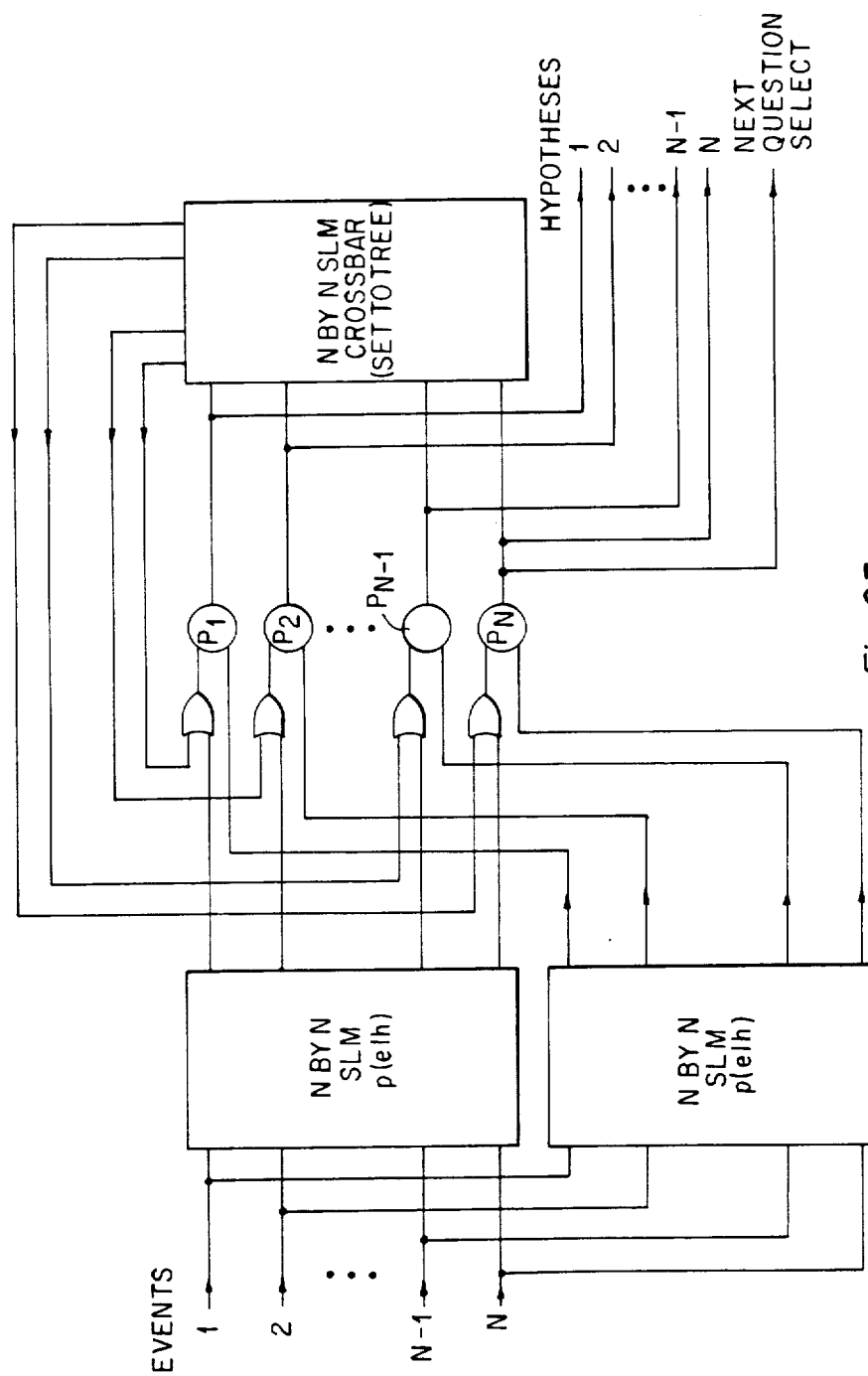
FIGS. 23 and 25 show an implementation for the expert system.

FIG. 23 shows the implementation of te flow graph in FIG. 22 on a system having three SLMs and N processors; note that the SLMs are shown as transmissive rather than reflective for clarity. The two interconnection networks at the left of FIG. 23 use SLMs to store the a priori probabilities associated with the probability of an event (or symptom) occurring for a specific outcome (or illness) in the upper network and that for the specific outcome not occurring in the lower network.

The parallel processors perform the computations of addition, multiplication and division in the center of FIG. 22. Note that the connections for this part do not require transfer of data between the processors to that SLMs are not required. The parallel processors also perform the same computation for determining the best next question. In addition the magnitude of the difference between the results for a yes answer and a no answer are computed.

Figure 24:
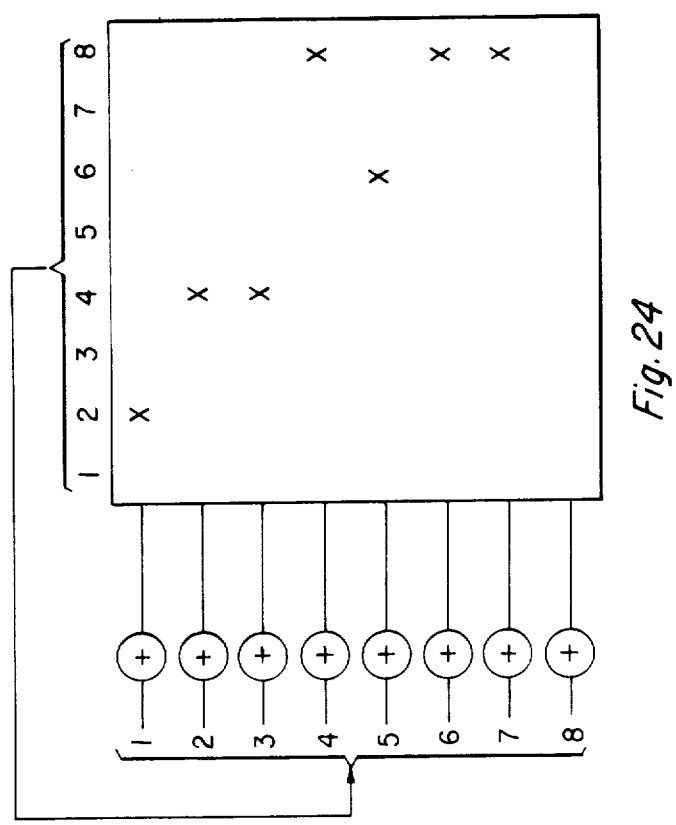
FIG. 24 is an example of crossbar switch settings for a doubling summer.

The third SLM is used as a crossbar switch to perform the doubling summation in equation (17) by means of a tree achieved by $\log_2 N$ passes through the switch. The only reason for using an SLM here is to provide reconfigurability for different algorithms. The switch setting is shown in FIG. 24 of an 8 by 8 case for illustration. Processor one, three, five, and seven communicate their values to processors two, four, six, and eight respectively on the first pass. After addition in the latter, the results are passed from processors two to four and six to eight for further summation. On the last pass, processor four sends its value to processor eight for summation to form the result. The resulting sensitivity factor is stored for comparison with that for all other not-yet-asked questions. The largest is used to identify the best next question.

Figure 25:
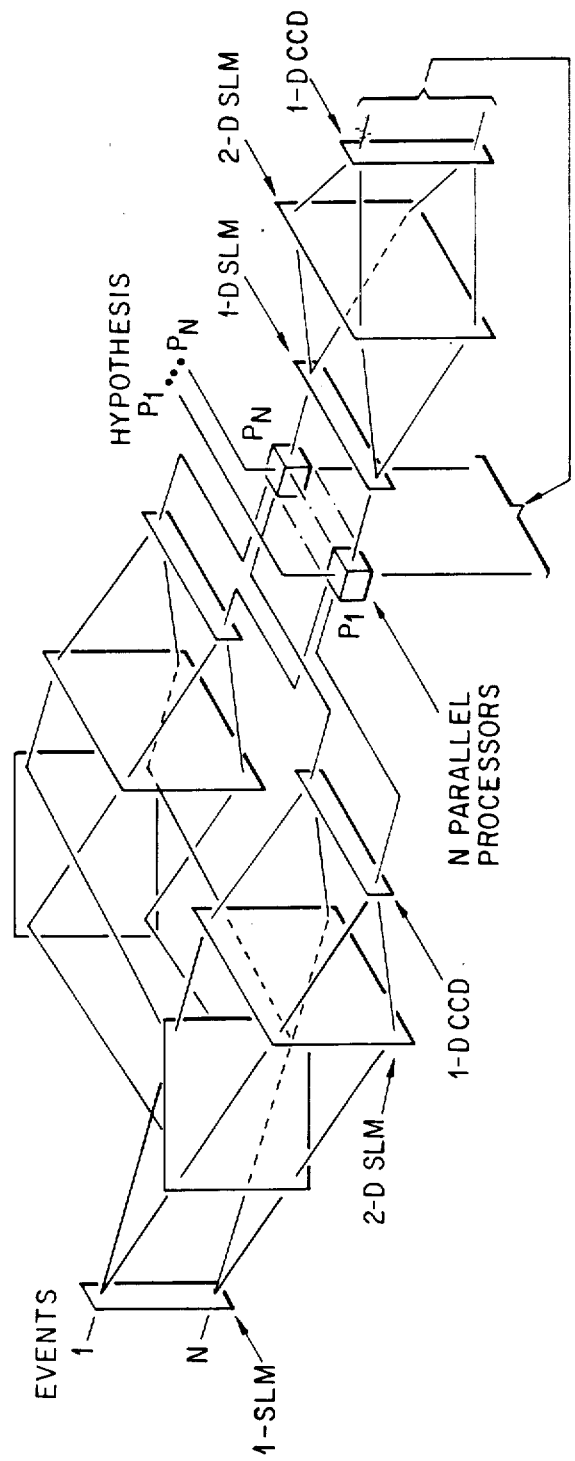

FIG. 25 shows a 3-D view of the optical flow for the system. The two 2-D SLMs for interconnection, storage and multiplication are thosen at the left. One stores probabilities of events occurring assuming the hypothesis is true and the second assuming the hypotheses is false. The answer to a question is used to activate the cell of the input 1-D SLM allowing laser light to pass. Light is collected at the 1-D CCDs and the electronic signal is transmitted to the N processors. The results from the two sides are merged in the N processors. The processor outputs drive laser diodes that connect via optical fibers to the input of the crossbar switch. This switch is used to implement the tree summer which is performed by looping through the processors and switch $\log_2 N$ times. The signal is transmitted from the 1-D CCD and the processors electronically. Thus the system uses SLMs both for crossbar switching and for database storage.

MODIFICATIONS AND ADVANTAGES

Various modifications of the preferred embodiment computers may be made while retaining the features of optical and dynamic reconfigurability of the interconnections of parallel elementary processors. For example, the number and type of processors could be varied with a mix of processor types, no all of the processors need be used so a dynamic change in algorithms that require differing numbers of processors is available, and certain subsets of elementary processors could be hard-wired interconnected so as to decrease the number of elementary processors interconnected by the crossbar switch and thus decrease the time required for resetting the crossbar switch. Of course, the elementary processors may be configured as pipelined by the crossbar switch; and the crossbar switch reconfigurability permits a time-sharing for different algorithms on the same computer. Also, the spatial light modulator could be a transmission type such as LCD or could be an array of smaller modulators; indeed, modulators based on quantum well devides appear to offer nanosecond switching times: see T. Wood et al. High-Speed Optical Modulation with GaAs/GaAlAs Quantum Well in a p-i-n Diode Strcture, 44 Appl. Phys. Lett. 16 (1984).

The preferred embodiment fast Fourier transform by a separation into real and imaginary parts for more efficient computation can be modified such as by use of known decimation in time or frequency with the number of points in the domain not a power of two.

Similarly, the preferred embodiment symbolic-numeric speech recognizer can be greatly modified while retaining the features of numeric and symbolic computations for each input frame such as correlation of each frame with a dictionary of frames and end-of-word inference rules. Instead of LPC other characterizations of the samples constituting a frame could be used, dynamic time warp could be eliminated or be more extensive allowing for greater and lesser factors of stretch, different end-of-word rules are available, and different or no parser for subdictionaries to limit the correlation search may be invoked.

Advantages of reconfigurability

Hard wiring provides the fastest system for implementing a specific algorithm but does not provide adequate flexibility to run a variety of algorithms. Busses tend to become saturated for most algorithms with more than ten or so higher performance processors (see A. D. McAulay, in Research in Structures and Dynamics-1984, R. J. Hayduk and Noor A, K, eds., NASA Publn. 2335, 15, (1984)). Nearest neighbor connections between processors are cost effective for some algorithms. For example, NASA's 2-D processor array, MPP, is effective for edge enhancement. Systolic arrays (see H. T. Kung, Computer, 15(1), 37 (1982)) such as have been built at Carnegie-Mellon University (see P. J. Kuekes and M. S. Schlausker, in Real Time Signal Processing VII, K. Bromley, ed., Proc. SPIE 495, 137 (1984)), ESL, Hughes (J. G. Nash and C. Petrozolin, in Intern. Conf. on Acoustics Speech and Signal processing, 85CH2118-8, 3, 1392 (1984)), and NOSC (J. M. Speiser and H. J. Whitehouse, in Real Time Signal Processing VI, K. Bromley, ed., Proc. SPIE 431, 2 (1983)) are effective for convolution, correlation and other easily pipelined operations and are expected to dominate conventional signal processing in the near future. However, algorithms requiring more complex connections perform less well and are difficult to map onto such processors, especially for an automatic system. The preferred embodiment computer may be reconfigured to give the appearance and performance of a hard wired system, a systolic array or a more complex network.

Generalized networks (H. J. Siegel, Interconnection networks for large scale parallel processing, theory and case studies", Lexington Books, 1984) of any size and speed are too costly with conventional semiconductor techn ology. Consequently, present day systems have multiple stages requiring several switches to be set between input and output or incomplete crossbar switches. The BBN Butterfly machine (see D. Y. Cheng, SRC Technical report No. 059. Univ. Cal. Berkeley, (1984)) has multiple stages by 4 by 4 crossbar switches interconnected with perfect shuffle networks and TRAC at UT Austin (J. C. Browne, Physics Today, 37(5), (1984)) uses 2 by 2 switches in a Banyan configuration. Multistages increase latency and control complexity. Message passing further increases overhead resulting in additional sacrifices of speed for flexibility. The Intel iPSC is based on the Cosmic Cube (C. L. Seitz. Communications of the ACM, 28(1), 22 (1985)) and has $2^6 = 64$ nodes with distributed memory at the vertices of a six dimensional hypercube interconnection system. Processors connect with six other processors out of 64 which provides more algorithm flexibility and control complexity than a systolic array but less flexibility than a fully reconfigurable network. The preferred embodiment signal processor has full reconfigurability and uses a preprogrammed optical switch to provide high speed, less latency and simpler control than a multistage reconfigurable system.

Advantages of programmed data flow

Programmed data flow reduces overhead time spent in memory address computation, instruction decodes and memory and instruction fetches. Data flow provides a mechanism for implementing a directed graph for an algorithm on to a suitable reconfigurable machine (J. B. Dennis, Computer, 13(11), 48(1980), D. R. Treleaven, R. Brownbridge, and R. P. Hopkins, Computing Surveys, 14(1), (1982), and D. Oxley, B. Sauber, M. Cornish, in Handbook of Software Engineering, C. R. Vick and C. V. Ramamoorthy, eds., (1984)). An operator acts as soon as it has all the input tokens necessary. Flexibility and ability to perform recursive functions have a higher priority than speed in most data flow projects which tend to be aimed toward general computation or Artificial Intelligence rather than signal processing. Machines generally involve dynamic allocation of processors and transmission of packets containing information regarding future operations and routing as well as data. Examples of current prototype machines are the MIT machine (Arvind and R. A. Iannucci, MIT Report, MIT/LCS/TM-241, (1983)), the Manchester Data flow machine (J. R. Gurd, C. C. Kirkham, and I. Watson. Communication of the ACM, 28(1), 34 (1985)), the Japanese Sigma-1 machine (K. Hiraki, T. Shimada, K. Nishida, in International Conf. on Parallel Processing, R. M. Keller, ed., 84CH2045-3, Proc. IEEE, 524 (1984)) and the Texas Instruments machine (M. Cornish, in 3rd Conf. on Digital Avionic Systems, Proc. IEEE, 19 (1979)).

The preferred embodiment computers in effect use programmed data flow. The data paths and sequence of operations at each elementary processor are precomputed to reduce the need for sending overhead bits. Each elementary processor with all required inputs will perform its predesignated operation on data from inputs or internal memory as determined by local code and a synchronization pulse. The object is to achieve maximum throughput and minimum latency by predetermined simple control and data flow strategies.

Advantages of optical interconnections

Optical interconnections have the advantage over electronic interconnections of reducing effects of capacitance loading and have more immunity to mutual interference. Optics has been suggested for communication with VLSI to overcome the bandwidth pin limitations and edge connection constraints and for connecting multiprocessors. The communications industry is developing optical switching devices to avoid conversion to electronics and back for switching purposes when using optical fibers. Developments in optical spatial light modulators suggest that crossbar switches may become available with cost, speed and size unlikely to be matched by conventional semiconductor technologies. Digital optical computers are expected to eventually become viable and a design for solving nearest neighbor problems appears in applicant's copending application Ser. No. 777,660. Such computers, unlike the preferred embodiments, have limited flexibility because of the interconnection systems used and are not aimed at real time processing applications.

Desired features for multiprocessor

A high performance multiprocessor is desired that is extendable to more processors with a corresonding increase in performance. It must also be flexible and reliable. Extendability implies that more processors may be added to the multiprocessor together with corresponding interconnections without requiring new software and with performance approaching linear improvements with increasing number of processors. This will enable the same architecture and associated software to apply to a wide product range and provide longer life for customers and products. This implies that high performance versions of the machine must be built initially and that the machine must be capable of further extension to satisfy demand for many decades.

High performance involves considerations of throughput and latency. High throughput is suitable for many large problems because repetitive computations are often required. However, minimum latency is also required because of those situations where results are needed before subsequent computations can be performed. Flexibility implies that a wide range of algorithms must run effeciently. Also, new algorithms and as yet undiscovered algorithms must be easily entered into the machine and run efficiently. Reliability is required in any complex system.

Extendability to larger high performance systems increase the likelihood of interference because of longer cable. This reduces the reliability. Reliability is often accomplished by means of redundancy in software, hardware, time and/or space. This is detrimental to satisfying performance for a given cost. It also limits extendability.

Figure 26:
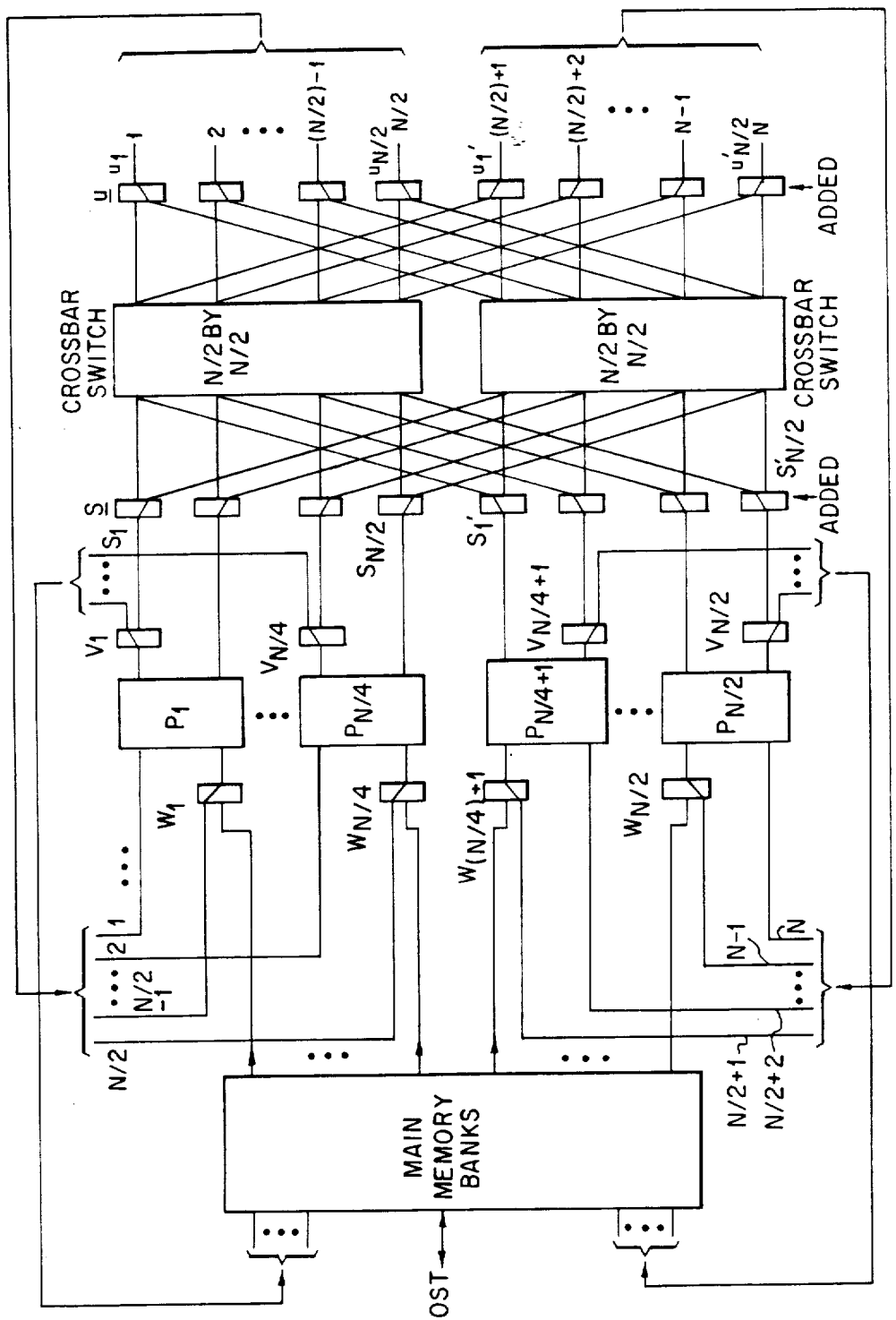
FIG. 26 illustrates an extension of an optical crossbar connected parallel processor computer to twice the original number of porcessors.

A specific extendability approach is illustrated for extending the single crossbar system described previously to double the size. As shown in FIG. 26, a second identical single-crossbar system is placed next to the first. The optical fiber connections into and out of the crossbar switches are opened and exchange switches s and u inserted, respectively.

The switches that implement the exchange switch at the input to the crossbar are marked $s_1$ through $s_{N/2}$. The second part of each switch is marked $s_1'$ through $s'_{N/2}$. Consider the activity between the input to a switch, say $s_1$ and $s_1'$, and the input to the crossbar switches. The effect is that of a 2 by 2 switch for which the two inputs are either connected directly to the two outputs or in an exchanged configuration. An example is provided by the top output for processor $P_1$ and the top output of processor $P_{N/4+1}$. If $P_1$ is connected to the top input of the top crossbar switch then $P_{N/4+1}$ is connected to the top input of the lower crossbar switch. In the exchanged position (as shown in FIG. 26, $P_1$ is connected to the top input of the lower crossbar switch and $P_{N/4+1}$ is connected to the top input of the upper crossbar switch.

An exchange switch, $u_1$ through $u_{N/2}$, is similarly incorporated between the output of the crossbar switches and the input to the processing elements. An example is provided when the top output from the upper crossbar switch is connected to output 1 at the right, then the top output of the lower crossbar switch is connected to output N2+1 at the right side. In the exchange position, the top output of the upper crossbar switch is connected to output N2+1 at the right and the top output of the lower crossbar switch is connected to output 1 at the right.

An electro-optic switch may be used to implement the exchange switch s by directing light into one of two fiber channels. A combining coupler is used at the input to the crossbar switch to permit light to pass from either channel. The switches v may be implemented with similar electro-optic cells. Similarly, the output exchanges switches u may be implemented using a reverse electro-optic cell. Only one of the input light channels is permitted to generate an electronic signals. The electronic signal is then converted to light for transmission back to the processor.

It is known that two N/2 by N/2 crossbar switches and the associated two sets of N/2 exchange switches together represent a full crossbar switch of size N by N.

This increases control complexity but uses less switches than the four crossbar switch system noted in infra. If two by two optical switches, such as DMDs, are used, for which OR operations are possible, all the original features of the optical switch are maintained for the larger size. Hence, from the software point of view the system is identical to the previous single-crossbar system, except for doubling in size. The resulting system will lack OR capability if generalized two by two switches are used with no OR capability. Further, some broadcast capability is lost is exchange switches are used permitting only permutations and not broadcasting. For example, the system now permits inputs to broadcast to only half the outputs. This case was described in the last section. Only one control bit rather than two is required for control of the two by two switches. The crossbar switch is still complete or nonblocking and provides $N^2$ well defined mappings from input to output.

If we omit the exchange switches at the crossbar output, u, it is still possible to reach any output from any input. However, blocking may now occur and the total available mappings are only N! This is illustrated using FIG. 26. Suppose it is desired to contact via the crossbar switches the top output of processor $P_1$ to the input of processor $P_{N/2}$ and at the same time the top output of processor $P_{N/4+1}$ to switch $s_1$ to the downward switch position (as shown in FIG. 26) and $u'_{N/2}$ to the downward switch position (opposite to that shown in FIG. 26). Consequently, the other half of the first switch $s_1'$ is set upward. In order to accomplish the second connection $u_1'$ must be set upward. Absence of this latter switch would result in blocking of this second connection by the first.

The system may be doubled in size again by placing a second system like that in FIG. 26 beside the first. The inputs to switches s and outputs from exchange switches u are now broken and further exchange switches inserted. Doubling may be applied recursively until physical constraints arise. Depending on the properties of the two by two switches some features relative to a single larger DMD optical switch may be increasingly lost as the amount of switching in the two by two switches increase relative to that in the optical DMD switches. The complete or nonblocking feature is maintained.

Interconnection alternatives for extendability

Alternative approaches to extendability include four crossbar switches of size N/2 by N/2 used to construct a double size N by N crossbar switch system. N/2 inputs are connected in parallel into crossbar switches one and two and the other N/2 inputs are connected in parallel into switches three and four. The outputs of switches one and three are connected in parallel to produce N/2 outputs and the outputs of switches two and four are connected in prallel to produce the other N/2 outputs. OR capability is maintained.

Finding, isolating and correcting faults

The use of multiple crossbar switches permits a degree of fault tolerance. Diagnostic programs and data may be run through the system periodically to verify correct operation. Failure to respond correctly to diaganostics is followed by testing each crossbar separately with the same diagnostics. Testing with the exchange switches interchanged will further determine whether processors or switches are at fault. In the former case reconfiguration will be made with the offending processing element disconnected. In the latter case, the system performance will be reduced if the switch is no longer permitted during reconfiguration. Repair of offending processors or switches should be possible without stopping the system.

System features

Sections of a computation often involve global communication or are not divisible into sufficiently large parallel pieces for efficient computation on a parallel machine. This becomes more of a problem as the number of processors is increased because the parallelizable parts are performed faster and the difficult parts become more of a bottleneck. Fine granularity and the broadcast capability of the crossbar switch permit these difficult parts to run efficiently on the proposed optically interconnected system. Consequently, the crossbar switch system may be extended to more processors without this difficulty.

Optical interconnections are needed to provide the high bandwidth required for fine granularity parallelism. Photons are inert compared to electrons, therefore the proposed system has a higher immunity to interference than electronic systems. This assists in extendability where distances to new processors and memory are likely to be further than for a smaller number of initial processors. Greater immunity to interference is important for enhancing reliability. Packaging is simplified when components need not be very close.

The optical crossbar provides reconfigurability, in fact $N^2$ well defined links, between processing elemwent. Reconfigurability enables a wide range of algorithms to be efficiently implemented as is required to meet the flexibility requirement. The large number of alternative paths assists reliability because failute of a processing element degrades performance only slightly after configuration. The processing element or switch may even be repaired without stopping the system. The system may be extended by adding more crossbar and two by two switches to emulate larger crossbar switdches. Consequently, the same software may be used after extension. The optical switch has a higher throughput than conventional electronic crossbar switches and does not require $N^2$ interconnections. It is easier to map algorithms onto a full crossbar switch than onto a constrained or reduced switch, thus making automatic mapping of algorithms by means of a computer feasible. Otherwise a directed graph for an algorithm must be mapped onto a directed graph for a processor interconnection system.

Static dataflow permits prior arrangement of data flows. This significantly reduces run time overhead. Conventional architectures require the computation of addresses for the operands for an operation and then the finding of these addresses and the fetching of the data. An instruction must then be decoded, the operation performed and an address computed for storing the solution.

Computing performance of extended processor

Previous research showed that some algorithms, such as conjugate gradients for solving larger sets of linear equations, may be implemented with over 90% efficiency even when there is a mismatch between the number of processing elements and the dimension of the problem. This is still true for an extended processor having more crossbar switches and processing elements because both communication and computation are increased in the same proportions. Rapid solution is not critical for problems much smaller than the machine unless there are a larger number of them. In this case the processor may be reconfigured to provided pipelining or parallel computation of the small problems and will achieve very high efficiencies.

Algorithsm, such as Levinson's, that are iterative with increasing dimension and the number of iterations are determined during computation, are difficult to implement efficiently on parallel machines. The extended machine will still speed up computation in proportion to the increase in processors, no matter what the efficiency. Unrolling loops of the iteration provides faster speeds because control for these loops is no longer required at rum time. This may be beneficial even if the occasional problem does not require all the loops. Tags are used in the architecture to indicate when processing elements should not operate on data for reasons such as this. Algorithms, such as Levinson's, may be implemented with 100% efficiency by pipelining when there are many cases of known dimension.

Desirable features for a high performance processor include extendability, flexibility and reliability. These features are difficult to achieve at the same time as indicated. An optical crossbar interconnected processor proposed earlier was shown to be extendable to recursively doubling the system. Processing elements, switches and crossbar switches are added in the same proportions. The advantages of the system are carried through to the new system and proportional increase in performance with increasing number of processors is anticipated. Extendability would not be possible without the specific features of the machine. Fine granularity enables parallelism to be extracted where other machines could not. Therefore, for such cases, the other machines would exhibit severe degradation in performance with increased numbers of processors. The high bandwidth optical interconnections make it possible to have fine granularity. Reconfigurability of the crossbar permits the extended system to operate with the same software. It also provides algorithm flexibility for adjusting to the change in the relative dimensions between problem and machine because of the changing number of processors. Reconfigurability, high levels of parallelism, multiple crossbar switches and optical links provide the opportunity for high reliability.

What is claimed is:

1. A computer, comprising:
   (a) a plurality of processors in parallel and arranged into groups:
   (b) a plurality of resettable optical crossbar switches, one crossbar switch for each of said groups: said crossbar switches switchably interconnecting the processors in its group pairwise so that an output from a first processor is directed to an input of a second processor in the same group when a corresponding optical crossbar switch is set;
   (c) a plurality of exchange switches, each coupled to one group of the processors and at least one resettable optical crossbar switch for directing outputs from the group of processors to the inputs of the at least one crossbar switch and outputs from that at least one crossbar switch to the inputs of the group of processors:
   (d) a controller coupled to said crossbar switches and said exchange switches, said controller controlling the setting of said optical crossbar switches and exchange switches according to a predetermined procedure; and
   (e) input/output device connected to at least one group of said plurality of processors.

2. The computer of claim 2, wherein:
   (a) said plurality of processors is arranged into first and second groups:
   (b) said plurality of crossbar switches is two crossbar switches in equal size: and
   (c) said plurality of exchange switches is a first set of switches with each switch having a fist output to a first crossbar switch and a second output to a second crossbar switch and a second set of switches with each switch having a firstinput from said first crossbar switch and a second input from said second crossbar switch.

* * * * *